United States Patent
Tanaka

(10) Patent No.: US 9,723,231 B2
(45) Date of Patent: Aug. 1, 2017

(54) IMAGE DATA PROCESSING APPARATUS AND METHOD THEREFOR FOR PIXEL DATA

(71) Applicant: SOCIONEXT INC., Yokohama-shi, Kanagawa (JP)

(72) Inventor: Masaki Tanaka, Kasugai (JP)

(73) Assignee: SOCIONEXT INC., Yokohama (JP)

( * ) Notice: Subject to any disclaimer, the term of this patent is extended or adjusted under 35 U.S.C. 154(b) by 466 days.

(21) Appl. No.: 14/270,187

(22) Filed: May 5, 2014

(65) Prior Publication Data

US 2014/0347518 A1 Nov. 27, 2014

(30) Foreign Application Priority Data

May 27, 2013 (JP) .................................. 2013-110560

(51) Int. Cl.
*H04N 3/14* (2006.01)
*H04N 5/335* (2011.01)
*H04N 1/21* (2006.01)

(52) U.S. Cl.
CPC ........... *H04N 5/335* (2013.01); *H04N 1/2129* (2013.01); *H04N 1/2133* (2013.01); *H04N 1/2137* (2013.01); *H04N 1/2141* (2013.01); *H04N 3/14* (2013.01)

(58) Field of Classification Search
CPC .. H04N 1/2137; H04N 1/2141; H04N 1/2145; H04N 5/335; H04N 3/14; H04N 3/00; H04N 1/21; H04N 1/2133; H04N 1/2125; H04N 1/2129
See application file for complete search history.

(56) References Cited

U.S. PATENT DOCUMENTS

| 5,293,236 A | * | 3/1994 | Adachi | G11C 16/102 348/231.2 |
| 5,650,862 A | * | 7/1997 | Shimizu | G06T 1/00 358/443 |
| 6,031,638 A | * | 2/2000 | Rao | H04N 1/32358 358/474 |
| 6,801,674 B1 | * | 10/2004 | Turney | G06T 3/0006 348/580 |

(Continued)

FOREIGN PATENT DOCUMENTS

| JP | 08-096116 A | 4/1996 |
| JP | 2001-067265 A | 3/2001 |

(Continued)

*Primary Examiner* — Twyler Haskins
*Assistant Examiner* — Akshay Trehan
(74) *Attorney, Agent, or Firm* — Arent Fox LLP

(57) ABSTRACT

A write control unit selects, in a row or column direction, N storing units from N×N storing units for storing pixel data of N (N≥2) read lines of image pickup devices and writes the data in sets of N pixels thereto, and switches a selection direction for selecting the storing units each time writes of the data of N lines are completed. A read control unit selects, in a direction different from the selection direction, N storing units and starts parallel reads of the data of N lines during writes of the data of every N-th line. Each storing unit to be first selected in the writes of the data of every N-th line performs write and read operations using different terminals, and each of the remaining storing units performs write and read operations using a common terminal.

6 Claims, 19 Drawing Sheets

(56) References Cited

U.S. PATENT DOCUMENTS

| | | | |
|---|---|---|---|
| 7,379,609 B2* | 5/2008 | Park | H04N 1/32358 345/574 |
| 2008/0136951 A1 | 6/2008 | Nishimoto | |
| 2008/0240593 A1* | 10/2008 | Tsai | H04N 19/423 382/238 |
| 2010/0039437 A1* | 2/2010 | Kobayashi | G06F 3/1415 345/545 |
| 2011/0032262 A1* | 2/2011 | Furusawa | G06T 1/60 345/545 |
| 2012/0182442 A1* | 7/2012 | Kirsch | H04N 5/23229 348/222.1 |
| 2013/0155279 A1* | 6/2013 | Khan | H04N 5/335 348/231.99 |
| 2014/0028876 A1* | 1/2014 | Mills | H04N 5/77 348/231.99 |

FOREIGN PATENT DOCUMENTS

| | | |
|---|---|---|
| JP | 2008-167386 A | 7/2008 |
| WO | WO 01/15173 A1 | 3/2001 |

\* cited by examiner

| input | output | | | |
|---|---|---|---|---|
| STATE | WSEL_C | WSEL_L | RSEL_C | RSEL_L |
| 001 | 1000 | WCNT | RCNT | 1111 |
| 010 | 0100 | WCNT | RCNT | 1111 |
| 011 | 0010 | WCNT | RCNT | 1111 |
| 100 | 0001 | WCNT | 1111 | RCNT |
| 101 | WCNT | 1000 | 1111 | RCNT |
| 110 | WCNT | 0100 | 1111 | RCNT |
| 111 | WCNT | 0010 | 1111 | RCNT |
| 000 | WCNT | 0001 | RCNT | 1111 |

FIG. 9

| input | | output | | | |
|---|---|---|---|---|---|
| RCNT | STATE[2] | LINE0 | LINE1 | LINE2 | LINE3 |
| 1000 | 0 | DO0 | DO4 | DO8 | DO12 |
| 0100 | 0 | DO1 | DO5 | DO9 | DO13 |
| 0010 | 0 | DO2 | DO6 | DO10 | DO14 |
| 0001 | 0 | DO3 | DO7 | DO11 | DO15 |
| 1000 | 1 | DO0 | DO1 | DO2 | DO3 |
| 0100 | 1 | DO4 | DO5 | DO6 | DO7 |
| 0010 | 1 | DO8 | DO9 | DO10 | DO11 |
| 0001 | 1 | DO12 | DO13 | DO14 | DO15 |

FIG. 10

IMAGE DATA PROCESSING APPARATUS AND METHOD THEREFOR FOR PIXEL DATA

CROSS-REFERENCE TO RELATED APPLICATION

This application is based upon and claims the benefit of priority of the prior Japanese Patent Application No. 2013-110560, filed on May 27, 2013, the entire contents of which are incorporated herein by reference.

FIELD

The embodiments discussed herein are related to an image data processing apparatus and an image data processing method.

BACKGROUND

In recent years, image pickup devices operate at increasingly higher frequencies due to an improvement in performance. Outputs from the image pickup devices are made irrespective of the operation of an image signal processor (ISP) provided in the subsequent stage, however, a conventional ISP is limited in increasing the operating frequency to process inputs from the image pickup devices in real time, due to the performance limitations of its memory in terms of the operating frequency.

In view of this problem, there has been proposed a technique in which, as for pixel data read from image pickup devices in order of raster scanning, an ISP receives, at a time, the pixel data corresponding to a plurality of pixels and processes the received pixel data in parallel, to thereby reduce the operating frequency in the ISP.

Note however that by simply outputting, in parallel, the pixel data received in sets of a plurality of pixels input in raster scan order from the image pickup devices, the data output in parallel does not appear in the raster scan order but appears in a skipping sequence of the raster scan order with an interval. This condition does not allow parallel processing taking place in a subsequent circuit. Therefore, using line buffers, for example, the parallel data in the skipping sequence needs to be reordered so as to allow the parallel processing in the subsequent circuit.

Japanese Laid-open Patent Publication No. 8-96116
Japanese Laid-open Patent Publication No. 2001-67265

In the case of processing N pixels in parallel, N line buffers (random access memories (RAM), for example) may be used. As described above, outputs (reads) from the image pickup devices are made one after another irrespective of the operation of the ISP. In view of this, it is desired that, at the completion of data writes of N lines, reads allowing a write area for the next line to be secured have been completed. In order to do this, the reads may be carried out simultaneously with writes of the N-th line.

However, if the number of pixels to be processed in parallel (hereinafter, simply referred to as the 'parallel number') increases in this processing scheme, data writes of a new line may occur at addresses where reads of a previous line have yet to be completed, thereby overwriting and thus corrupting data of the previous line. One way to prevent such data corruption is to provide more than N line buffers, however, this results in an increase in the circuit area.

SUMMARY

According to one embodiment, there is provided an image data processing apparatus including N×N storing units configured to store pixel data of N (N≥2) read lines of image pickup devices; a write control unit configured to select, in a row or column direction, storing units for writing from among the N×N storing units and write the pixel data in sets of N pixels to each of the storing units selected for writing, and switch a selection direction for selecting the storing units for writing each time writes of the pixel data of the N read lines are completed; and a read control unit configured to select, in a direction different from the selection direction, N storing units for reading from among the N×N storing units and start parallel reads of the written pixel data of the N read lines during writes of the pixel data of every N-th read line. Among the N×N storing units, each storing unit to be first selected in the writes of the pixel data of every N-th read line performs a write and a read using different terminals thereof and each of the remaining storing units performs a write and a read using a common terminal thereof.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of a relationship between input and output signals of an input signal control unit;

FIG. 10 illustrates an example of a relationship between input and output signals of an output signal control unit;

DESCRIPTION OF EMBODIMENTS

Figure 1:
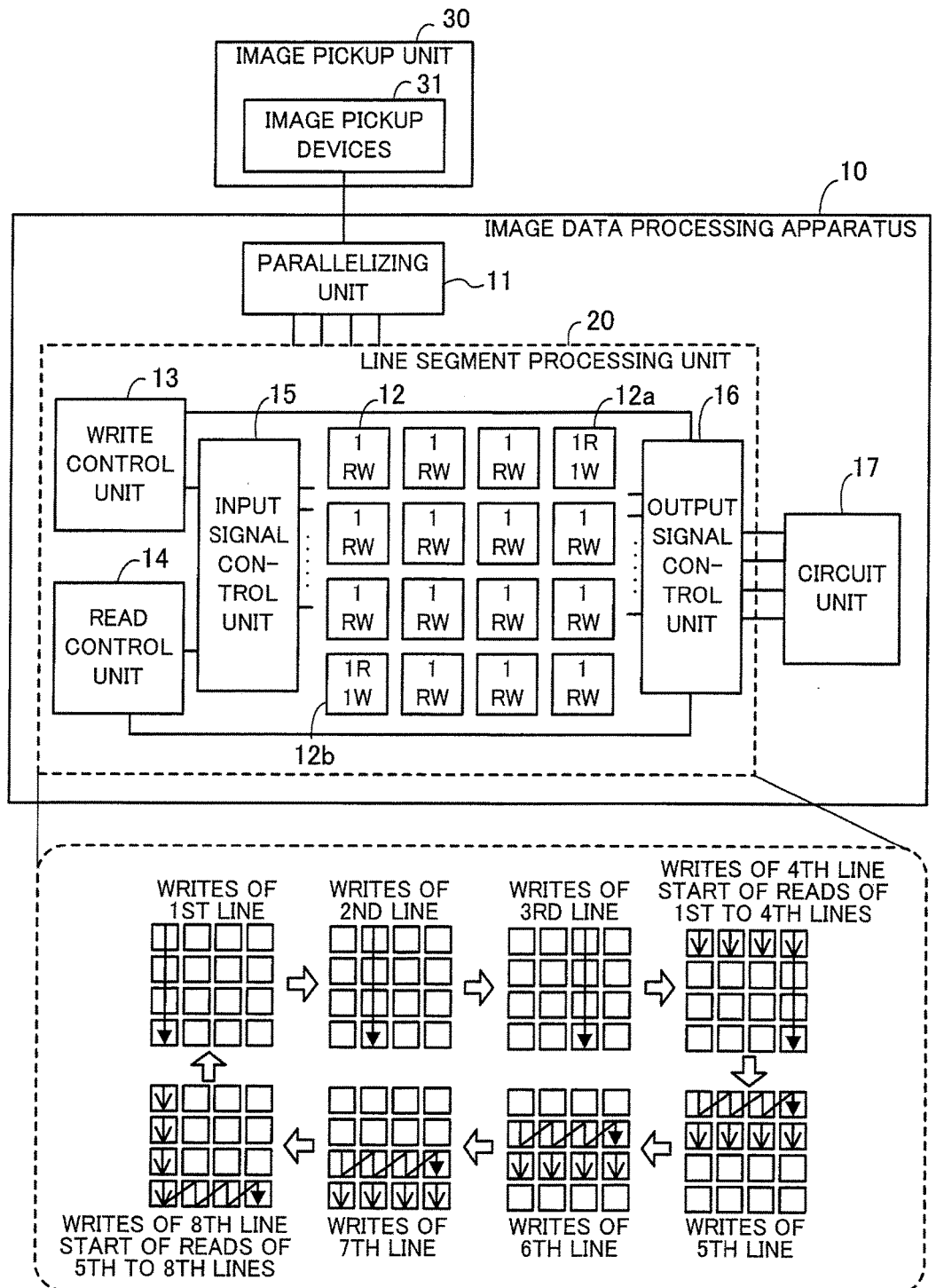
FIG. 1 illustrates an example of an image data processing apparatus and an image data processing method according to a first embodiment.

Several embodiments will be described below with reference to the accompanying drawings, wherein like reference numerals refer to like elements throughout.

(a) First Embodiment

FIG. 1 illustrates an example of an image data processing apparatus and an image data processing method according to a first embodiment. An image data processing apparatus 10 includes a parallelizing unit 11 and N×N (N≥2; note that N=4 in the example of FIG. 1) storing units 12 (note however that two storing units 12a and 12b are of a different type from the rest, as described later, and are therefore assigned the different reference numerals). The image data processing apparatus 10 also includes a write control unit 13, a read control unit 14, an input signal control unit 15, an output signal control unit 16, and a circuit unit 17. In the following description, a portion including the storing units 12, 12a, and 12b, the write control unit 13, the read control unit 14, the input signal control unit 15, and the output signal control unit 16 is referred to as a line segment processing unit 20.

The parallelizing unit 11 receives pixel data from image pickup devices 31 of an image pickup unit 30 according to the order of the pixel data being read (i.e. the raster scan order), and then generates N sets of parallel data each having a data sequence where one out of every N pixels in the raster scan sequence appears. Thus, the pixel data sequence of each set is formed with pixels extracted in a stepping stone fashion from the raster scan sequence. The generation of the N sets of parallel data reduces the frequency in the image data processing apparatus 10 to 1/N of the frequency of the image pickup devices 31. Note that the parallelizing unit 11 may be included, for example, in the image pickup unit 30.

The line segment processing unit 20 rearranges the individual sets of parallel data output from the parallelizing unit 11 in the raster scan order so as to be processed by the circuit unit 17 in the subsequent stage, and then outputs N sets of pixel data rearranged in the raster scan order. The N×N storing units 12, 12a, and 12b of the line segment processing unit 20 together have a capacity to store pixel data of N read lines (for example, N horizontal read lines) of the image pickup devices 31. In the case of N=4, sixteen storing units 12, 12a, and 12b store pixel data of four lines.

The write control unit 13 selects, in a column or row direction, N storing units from among the N×N storing units 12, 12a, and 12b, and writes, to each of the selected N storing units, pixel data in sets of N pixels output from the parallelizing unit 11. Then, the write control unit 13 switches the direction for selecting storing units (hereinafter, sometimes referred to as the 'storing-unit selection direction') each time writes of pixel data of N lines are completed. During writes of pixel data of every N-th line, the read control unit 14 selects N storing units in a direction different from the storing-unit selection direction for the writes and then starts parallel reads of pixel data of N lines.

Under the control of each of the write control unit 13 and the read control unit 14, the input signal control unit 15 generates a row selecting signal or a column selecting signal to thereby select storing units for writes and reads from among the N×N storing units 12, 12a, and 12b. Under the control of each of the write control unit 13 and the read control unit 14, the output signal control unit 16 selects appropriate N storing units from among the N×N storing units 12, 12a, and 12b, and outputs N sets of parallel pixel data to be supplied to the circuit unit 17 in the subsequent stage. Note that FIG. 1 omits, for example, data lines connecting the parallelizing unit 11 and the N×N storing units 12, 12a, and 12b and signal lines connecting the input and output signal control units 15 and 16 and the N×N storing units 12, 12a, and 12b.

Figure 2:
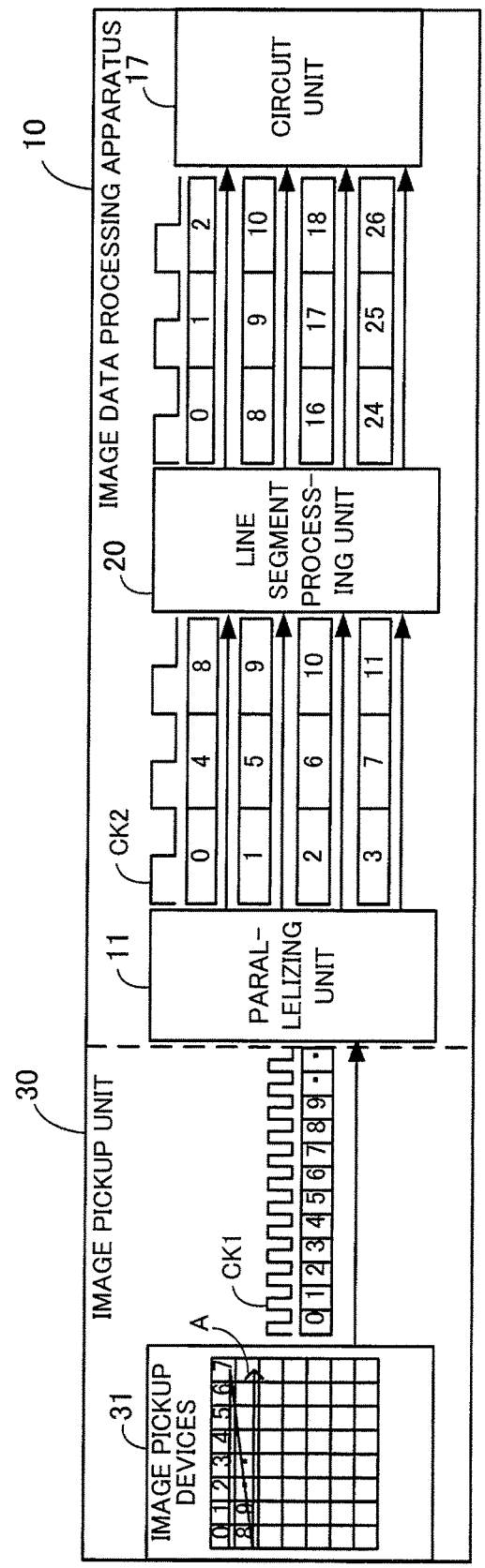
FIG. 2 illustrates an example where the image data processing apparatus receives data in sets of four pixels and processes the four sets of data in parallel.

Next described is an example of an operation of the image data processing apparatus 10 according to the first embodiment. FIG. 2 illustrates an example where an image data processing apparatus receives data in sets of four pixels and processes the four sets of data in parallel. In FIG. 2, the numbers 0 to 26 represent pixel data read from the image pickup devices 31 in reading order indicated by arrow A (i.e., in the raster scan order) in synchronization with a clock CK1. In the image data processing apparatus 10, operations are performed in synchronization with a clock CK2, which has ¼ the frequency of the clock CK1 in the image pickup unit 30.

The paralleling unit 11 outputs the pixel data read in the raster scan order from the image pickup devices 31 as four sets of parallel data, as illustrated in FIG. 2. At this point, each of the parallel data sets has a data sequence where one out of every four pixels in the raster scan sequence appears, for example, 0, 4, 8, . . . and 1, 5, 9, . . . . Therefore, the line segment processing unit 20 rearranges each of the parallel data sets into the raster scan order, which is then supplied to the circuit unit 17 in the subsequent stage.

The lower part of FIG. 1 illustrates an example of control on writes and reads of pixel data exercised in the line segment processing unit 20 in the case where the image data processing apparatus 10 receives data in sets of four pixels and processes the four sets of data in parallel. The example depicts eight states in each of which writes, or writes and reads, take place in the 4×4 storing units 12, 12a, and 12b. The write control unit 13 sequentially selects column-wise storing units from among the 4×4 storing units 12, 12a, and 12b, and causes the selected storing units to write therein pixel data in sets of four pixels input in parallel from the parallelizing unit 11. In this manner, as for horizontal read lines of the image pickup devices 31, pixels data of the read lines is first written to the selected column-wise storing units, sequentially from the first line. After completing writes of pixel data of four lines, the write control unit 13 then switches the storing-unit selection direction from column-wise to row-wise. Subsequently, after completing writes of pixel data of another four lines, the write control unit 13 switches the storing-unit selection direction from row-wise to column-wise.

During writes of pixel data of the fourth line after the storing units are selected in the column direction, the read control unit 14 selects four row-wise storing units to thereby start reads of pixel data of the first to fourth lines (parallel reads). At the completion of the writes of the pixel data of the fourth line, reads from the four storing units in the first row are completed (the reason is described later). This therefore allows pixel data of the fifth line to be written to the storing units in the first row right away. In this manner, it is possible to prevent pixel data of the first to fourth lines having yet to be read from being overwritten with the pixel data of the fifth line and thus corrupted. In addition, during writes of pixel data of the eighth line after the storing-unit selection direction is switched to row-wise, the read control unit 14 selects four column-wise storing units to thereby start reads of pixel data (parallel reads). At the completion of the writes of the pixel data of the eighth line, reads from the four storing units in the first column are completed. This therefore allows pixel data of the ninth line to be written to the storing units in the first column right away. In this manner, it is possible to prevent pixel data of the fifth to eighth lines having yet to be read from being overwritten with the pixel data of the ninth line and thus corrupted. The same control is exercised on pixel data of the ninth and subsequent lines of the image pickup devices 31.

According to the above-described control, write and read accesses are made at different times to each of the storing units 12, except for the storing units 12a and 12b, among the 4×4 storing units 12, 12a, and 12b. Therefore, a storage device having a common port (for example, a single-port RAM such as 1RW) for both write and read operations is used to implement each of the storing units 12. On the other hand, a storage device having different ports (for example, a dual-port RAM such as 1R1W) for write and read operations is used to implement each of the storing units 12a and 12b which has a first address to be designated during writes of pixel data of every fourth line.

This reduces the circuit area, compared to the case where all the storing units 12, 12a, and 12b are implemented by dual-port RAMs such as 1R1W. The rate of the dual-port RAMs declines further as the parallel number becomes larger, producing a greater effect in reducing the circuit area. In addition, it is possible to hinder data of a new line from being written at addresses where reads of a previous line have yet to be completed, thus preventing pixel data of the previous line from being overwritten and corrupted.

Next descried is a comparative example illustrating another image data processing method for receiving data in sets of four pixels and processing the four sets of data in parallel.

Comparative Example

Figure 3:
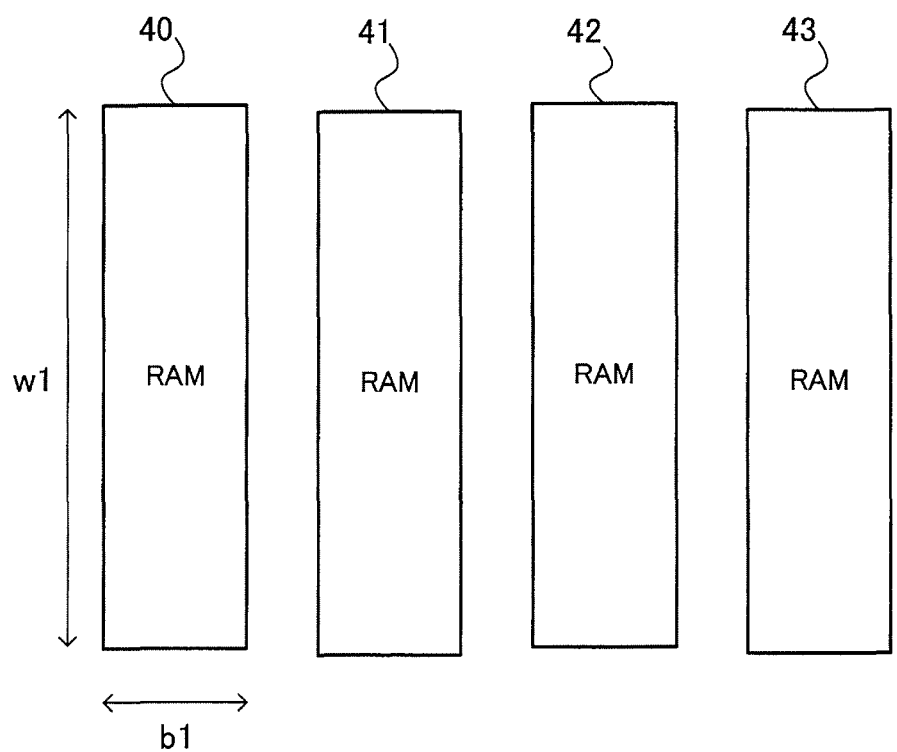
FIG. 3 illustrates an example of RAMs used for a reordering process.

FIG. 3 illustrates an example of RAMs used for a reordering process. To receive data in sets of four pixels and process the four sets of data in parallel, four RAMs 40 to 43 are used as illustrated in FIG. 3, unlike in the case of the image data processing apparatus 10 of the first embodiment. Each of the RAMs 40 to 43 stores therein pixel data of one horizontal line of the image pickup devices 31. In each of the RAMs 40 to 43, the number of bits b1 corresponds to four pixels, and the number of words w1 (four pixels per word) is one-quarter of the maximum horizontal pixel size.

Figure 4:
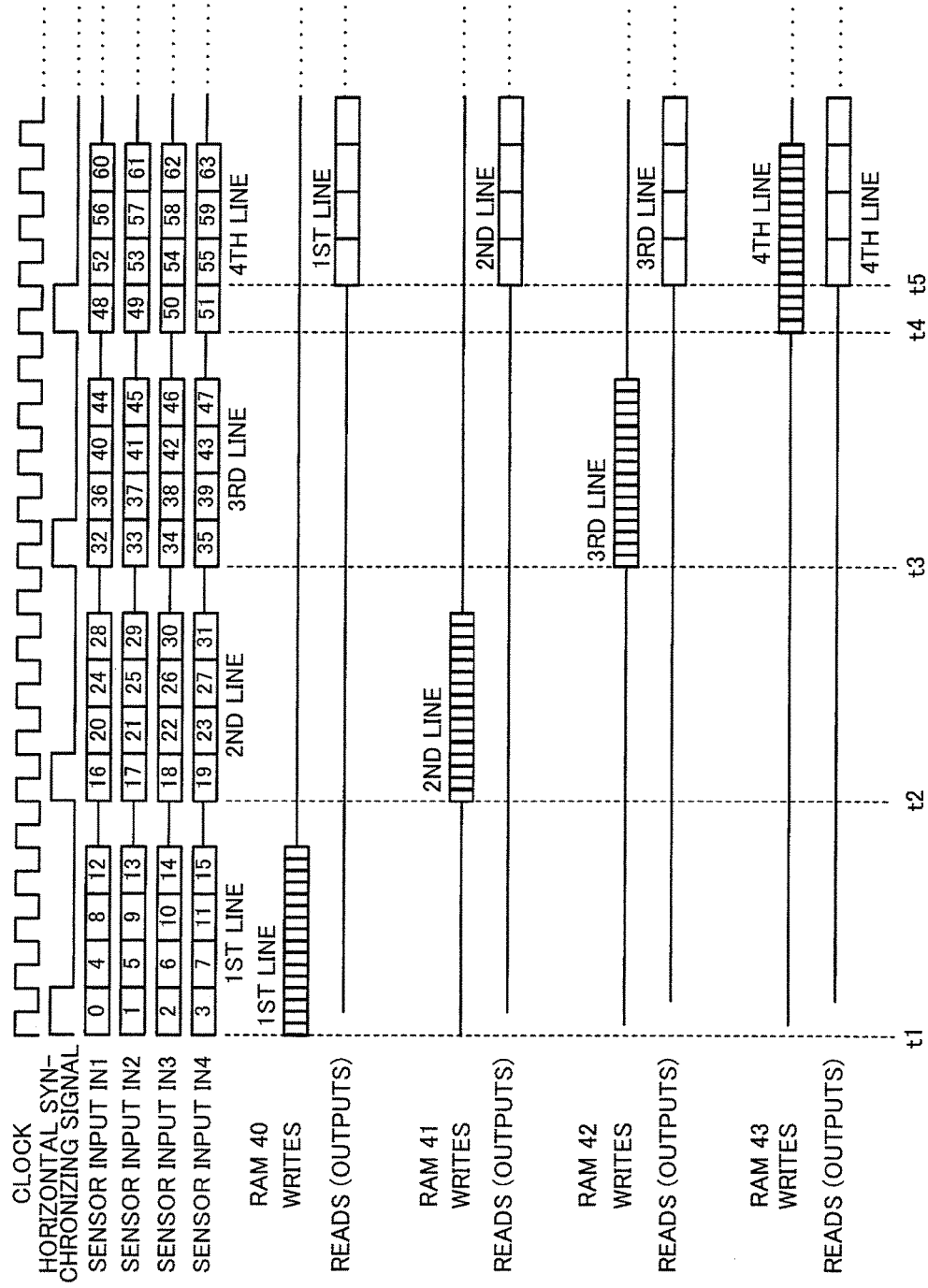
FIG. 4 is a first timing diagram illustrating an example of the reordering process using four RAMs.
Figure 5:
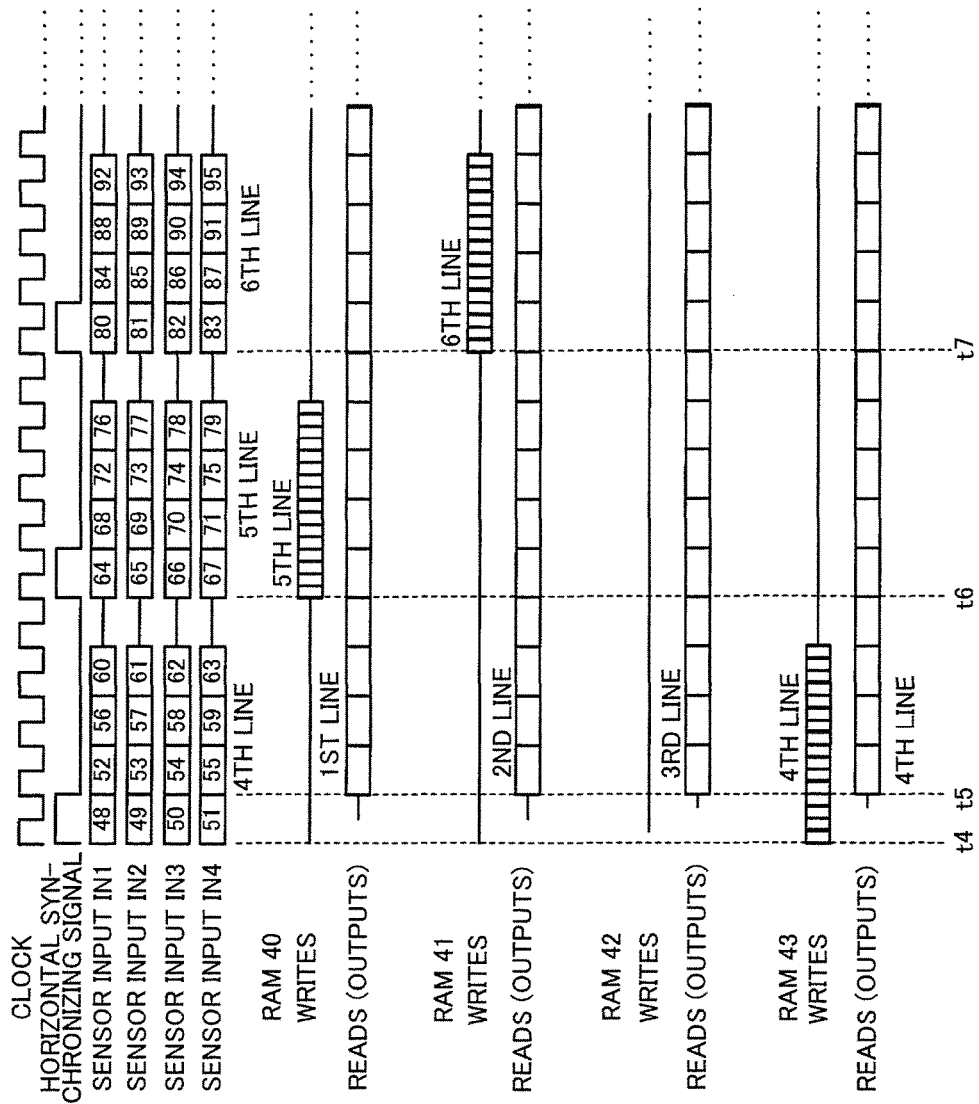
FIG. 5 is a second timing diagram illustrating the example of the reordering process using the four RAMs.

Writes and reads are performed on the RAMs 40 to 43 each having the above-described configuration in the following manner, for example. FIGS. 4 and 5 are timing diagrams illustrating an example of a reordering process using four RAMs. Each of the timing diagrams illustrates, from the top, a clock signal of the image data processing apparatus 10, a horizontal synchronizing signal, four sets of parallel pixel data supplied to the RAMs 40 to 43 (sensor inputs IN1 to IN4), and writes and reads (outputs) of the individual RAMs 40 to 43.

When the horizontal synchronizing signal rises from L (low level) to H (high level) (at time t1), pixel data of the first line in the image pickup devices 31 is converted into parallel data by the parallelizing unit 11, which is written to the RAM 40 as the sensor inputs IN1 to IN4, as illustrated in FIG. 4. Note that the horizontal synchronizing signal falls back to L at the next rising edge of the clock signal. That is, the horizontal synchronizing signal has a pulse width corresponding to one cycle of the clock signal.

When a pulse of the horizontal synchronizing signal is generated (time t2) shortly after reads of pixel data of the first line from the image pickup devices 31 are completed, pixel data of the second line is converted into parallel data by the parallelizing unit 11, which is written to the RAM 41 as the sensor inputs IN1 to IN4, as illustrated in FIG. 4. Similarly at times t3 and t4 when a pulse of the horizontal synchronizing signal is generated, writes of pixel data of the third and fourth lines are performed on the RAMs 42 and 43, respectively. Note however that, when pixel data of one word of the fourth line is written (at time t5), parallel reads of the pixel data of the first to fourth lines are started in order to secure an area for pixel data of the subsequent fifth line to be written.

However, when writes of the pixel data of the fifth line are started at time t6, reads of the pixel data of the first line have yet to be completed in the RAM 40, and some unread pixel data of the first line is overwritten with the pixel data of the fifth line. Similarly at time t7, when writes of the pixel data of the sixth line are started, reads of the pixel data of the second line have yet to be completed in the RAM 41, and some unread pixel data of the second line is overwritten with the pixel data of the sixth line.

As described above, the parallel data reordering process using the four RAMs 40 to 43 causes data corruption due to data overwriting when writes overtake reads. To prevent this from happening, the number of RAMs may be increased, for example, by two, which however increases the circuit size. In addition, in the reordering process as in the comparative example, writes and reads occur at the same time, as seen at times t4 to t6, and therefore the RAMs 40 to 43 are implemented using dual-port RAMs such as 1R1W, which also leads to an increase in the circuit size. The data corruption described above tends to occur when the parallel number is greater than or equal to 3.

On the other hand, the image data processing apparatus 10 according to the first embodiment prevents such data corruption by exercising the above-described write and read control using the N×N storing units 12, 12a, and 12b. In addition, the most storing units 12 except for the storing units 12a and 12b are implemented by single-port RAMs. Therefore, the occurrence of data corruption during reordering parallel pixel data may be prevented using a small-scale circuit.

Next described is an image data processing apparatus according to a second embodiment.

(b) Second Embodiment

Figure 6:
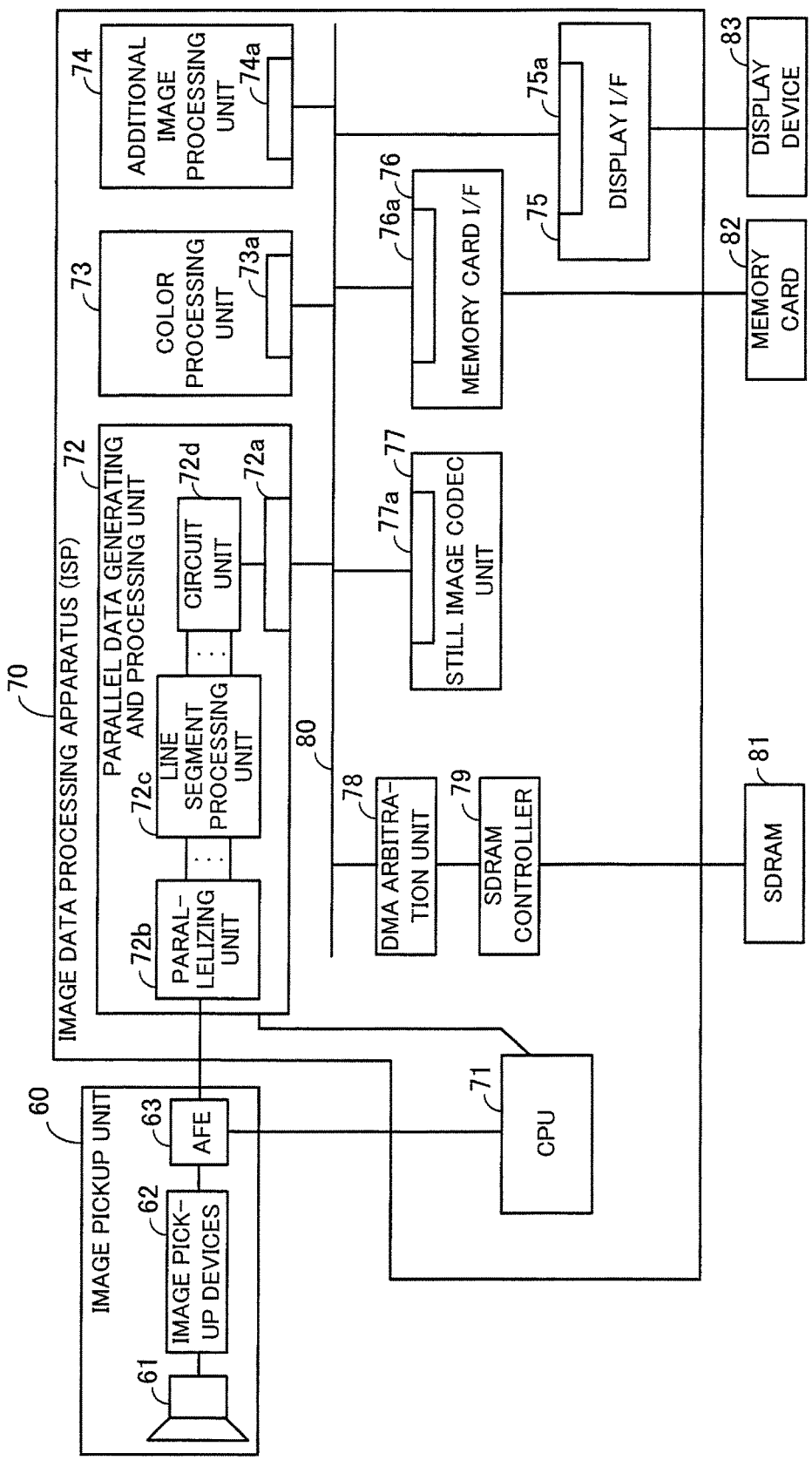
FIG. 6 illustrates an example of an image pickup apparatus to which an image data processing apparatus of a second embodiment is applied.

FIG. 6 illustrates an example of an image pickup apparatus to which an image data processing apparatus of a second embodiment is applied. An image pickup apparatus 50 includes an image pickup unit 60 and an image data processing apparatus 70. The image pickup unit 60 includes an imaging optical system 61, such as a lens and a reflector; image pickup devices 62, such as charge coupled devices (CODs); and an analog front-end (denoted as 'AFE' in FIG. 6) 63 including an amplifier, a filter, and an analog-to-digital converter (ADC).

The image data processing apparatus 70 is, for example, an ISP, and individual units of the image data processing apparatus 70 are controlled by a central processing unit (CPU) 71. The image data processing apparatus 70 includes a parallel data generating and processing unit 72, a color processing unit 73, an additional image processing unit 74, a display interface (denoted as 'I/F' in FIG. 6 and the following figures) 75, a memory card interface 76, a still image codec unit 77, a direct memory access (DMA) arbitration unit 78, and a synchronous dynamic random access memory (SDRAM) controller 79. In addition, the parallel data generating and processing unit 72, the color processing unit 73, the additional image processing unit 74, the display interface 75, the memory card interface 76, and the still image codec unit 77 include DMA controllers 72a, 73a, 74a, 75a, 76a, and 77a, respectively, which are connected to an internal bus 80.

The parallel data generating and processing unit 72 is connected to the image pickup unit 60, and includes a parallelizing unit 72b, a line segment processing unit 72c, and a circuit unit 72d, which implement the same functions as, for example, the parallelizing unit 11, the line segment processing unit 20, and the circuit unit 17, respectively, of FIG. 1 above. The circuit unit 72d is connected to the DMA controller 72a. A shading correction unit, a defective pixel correction unit, a noise reduction unit, and an auto exposure (AE)/auto focus (AF)/auto white balance (AWB) detection unit are examples of the circuit unit 72d.

The color processing unit 73 carries out processes of the color of a captured image, and the additional image processing unit 74 carries out all other types of image processes. The display interface 75 transmits and receives information between the image data processing apparatus 70 and a display device 83, and the memory card interface 76 transmits and receives information between the image data processing apparatus 70 and a memory card 82. The still image codec unit 77 performs encoding and decoding using various coding systems, such as Joint Photographic Experts Group (JPEG). The DMA arbitration unit 78 arbitrates data transfer requests to use the internal bus 80, sent from the DMA controllers 72a, 73a, 74a, 75a, 76a, and 77a. The DMA arbitration unit 78 is also connected to the SDRAM controller 79 for controlling the SDRAM 81. Note that the parallelizing unit 72b may be included in the image pickup unit 60.

Next described is an example of the line segment processing unit 72c of the parallel data generating and processing unit 72.

Line Segment Processing Unit 72c

Figure 7:
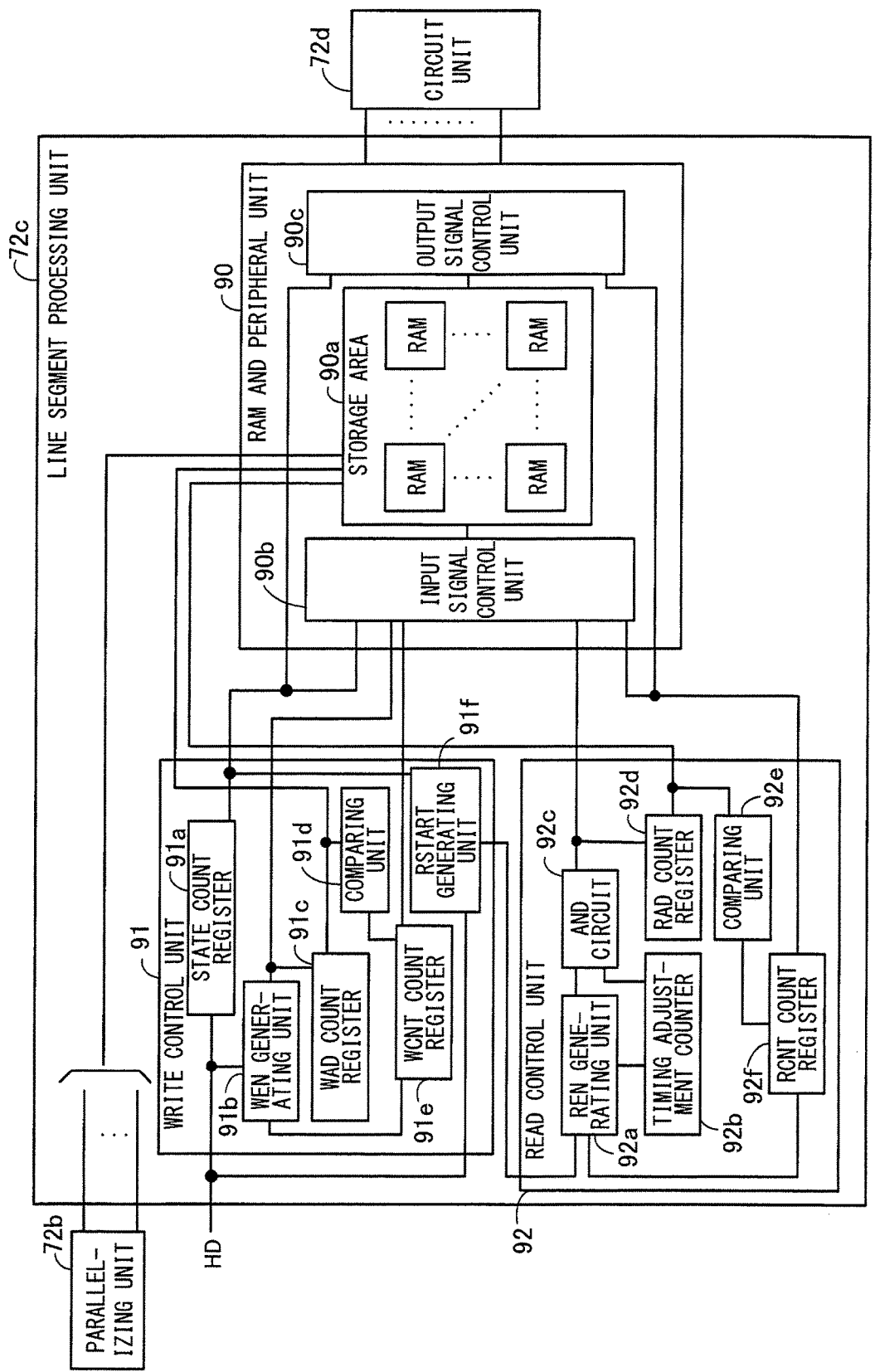
FIG. 7 illustrates an example of a line segment processing unit.

FIG. 7 illustrates an example of a line segment processing unit. The line segment processing unit 72c includes a RAM and peripheral unit 90, a write control unit 91, and a read control unit 92. The RAM and peripheral unit 90 includes a storage area 90a, an input signal control unit 90b, and an output signal control unit 90c. The storage area 90a includes N×N RAMs corresponding to the parallel number (N) of parallel data sets to be generated. Information input to the storage area 90a includes N sets of parallel pixel data parallelized by the parallelizing unit 72b, write addresses (WAD), and read addresses (RAD).

Under the control of each of the write control unit 91 and the read control unit 92, the input signal control unit 90b generates a row selecting signal or a column selecting signal to thereby select storing units for writes and reads from among the N×N RAMs. Under the control of each of the write control unit 91 and the read control unit 92, the output signal control unit 90c selects appropriate N RAMs from among the N×N RAMs, and outputs N sets of parallel pixel data to be supplied to the circuit unit 72d in the subsequent stage.

The write control unit 91 includes a STATE count register 91a, a WEN generating unit 91b, a WAD count register 91c, a comparing unit 91d, a WONT count register 91e, and a RSTART generating unit 91f. The STATE count register 91a counts the number of rising edges of the horizontal synchronizing signal HD and holds a count value STATE as an indicator of a write/read state. For example, in the case of the parallel number N=4, there are eight write/read states as illustrated in FIG. 1, and the STATE count register 91a holds a 3-bit value. Note that the horizontal synchronizing signal HD is generated, for example, by an interface unit (not illustrated) connecting to the image pickup unit 60.

The WEN generating unit 91b asserts a write enable signal WEN in synchronization with the rising edge of the horizontal synchronizing signal HD. During the write enable signal WEN being asserted, the WAD count register 91C increments a write address WAD in synchronization with a clock (not illustrated) of the image data processing apparatus 70.

The comparing unit 91d compares the write address WAD and an address threshold value RAMTH for changing a selected RAM. Then, when the write address WAD reaches the threshold value RAMTH, the comparing unit 91d asserts an enable signal for the WONT count register 91e, and also causes the WAD count register 91c to reset the value of the write address WAD. In the case of N=4, pixel data of one horizontal line of the image pickup devices 62 is written to four RAMs. At this point, data of four pixels is written in parallel to each of the RAMs at the same column or row address. Therefore, the threshold value RAMTH corresponds to 1/16 of the maximum horizontal pixel size of the image pickup devices 62.

The WONT count register 91e increments a count value WONT each time the comparing unit 91d asserts the enable signal. The count value WONT indicates a RAM for writes to occur. In addition, when the write address WAD has reached the threshold value RAMTH N times and, thus, writes of one line are completed, the WONT count register 91e negates the write enable signal WEN. The RSTART generating unit 91f generates a read start signal RSTART when the count value STATE is '0' or 'N'. The read start signal RSTART is, for example, a one-shot pulse.

The read control unit 92 includes a REN generating unit 92a, a timing adjustment counter 92b, an AND circuit 92c, a RAD count register 92d, a comparing unit 92e, and a RCNT count register 92f. Upon receiving the read start signal RSTART, the REN generating unit 92a asserts a read enable signal REN. The timing adjustment counter 92b is asserted once every N cycles of the clock signal (not illustrated) after the read enable signal REN is asserted, and transmits a signal '1' to validate the read enable signal REN. This adjusts the timing for accessing RAMs to read pixel data therefrom to be once every N cycles. The AND circuit 92c outputs the value of the read enable signal REN when '1' has been output from the timing adjustment counter 92b, and outputs '0' when '0' has been output from the timing adjustment counter 92b.

The RAD count register 92d increments the read address RAD when the timing adjustment counter 92b becomes saturated, that is, when the read enable signal REN outputs '1'. The comparing unit 92e compares the read address RAD and the address threshold value RAMTH for changing a selected RAM. Then, when the read address RAD reaches the threshold value RAMTH, the comparing unit 92e asserts an enable signal for the RCNT count register 92f, and also causes the RAD count register 92d to reset the value of the read address RAD. The RCNT count register 92f increments a count value RCNT each time the comparing unit 92e asserts the enable signal. The count value RCNT indicates a RAM for reads to occur. In addition, when the read address RAD has reached the threshold value RAMTH N times and, thus, reads are completed, the RCNT count register 92*f* negates the read enable signal REN.

Next described is an example of the RAM and peripheral unit 90 of the line segment processing unit 72*c*.

RAM and Peripheral Unit 90

Figure 8:
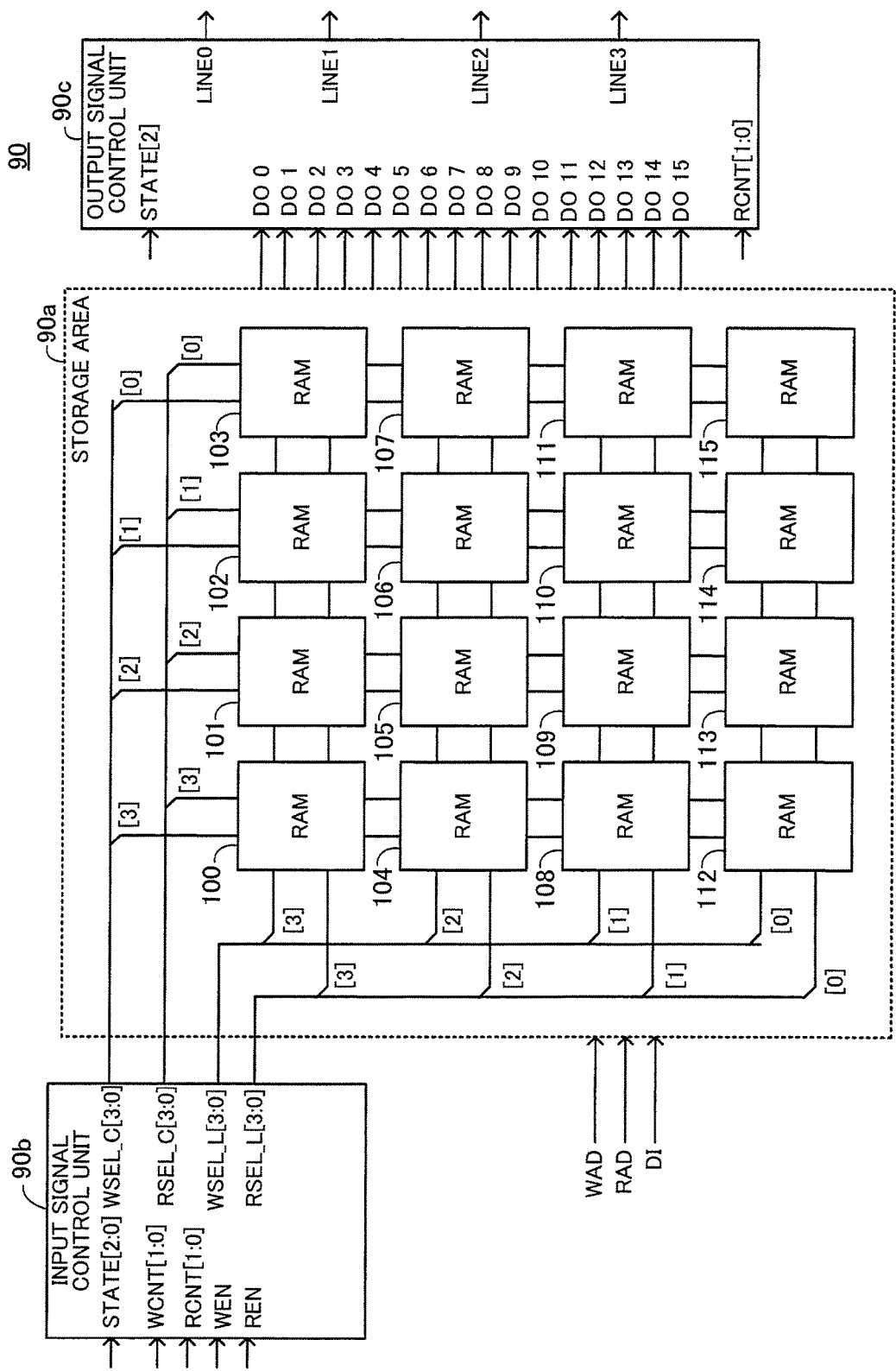
FIG. 8 illustrates an example of a RAM and peripheral unit in a case of parallel number N=4.

FIG. 8 illustrates an example of a RAM and peripheral unit in the case of the parallel number N=4. The write address WAD, the read address RAD, and four sets of parallel pixel data (input data DI) are input to all RAMs 100 to 115. Note that connection lines therebetween are omitted from FIG. 8 for simplicity. In addition, connection lines between the individual RAMs 100 to 115 and outputs DO0 to DO15 are also omitted.

The input signal control unit 90*b* inputs the 3-bit count value STATE from the STATE count register 91*a*. In addition, the input signal control unit 90*b* inputs the 2-bit count value WONT from the WONT count register 91*e*, the 2-bit count value RCNT from the RCNT count register 92*f*, the write enable signal WEN, and the read enable signal REN. Based on these signals, the input signal control unit 90*b* generates and outputs a write column selecting signal WSEL_C, a write row selecting signal WSEL_L, a read column selecting signal RSEL_C, and a read row selecting signal RSEL_L, which are all 4-bit signals.

The RAMs 100, 104, 108, and 112 are selected by the most significant bit [3] of the write column selecting signal WSEL_C and the read column selecting signal RSEL_C, and the RAMs 101, 105, 109, and 113 are selected by the next most significant bit [2]. Similarly, the RAMs 102, 106, 110, and 114 are selected by the next bit [1], and the RAMs 103, 107, 111, and 115 are selected by the least significant bit [0]. The RAMs 100, 101, 102, and 103 are selected by the most significant bit [3] of the write row selecting signal WSEL_L and the read row selecting signal RSEL_L, and the RAMs 104, 105, 106, and 107 are selected by the next most significant bit [2]. Similarly, the RAMs 108, 109, 110, and 111 are selected by the next bit [1], and the RAMs 112, 113, 114, and 115 are selected by the least significant bit [0].

FIG. 9 illustrates an example of a relationship between input and output signals of an input signal control unit. In FIG. 9, the 3-bit count value STATE of the STATE count register 91*a* is indicated as an input to the input signal control unit 90*b*. In addition, the write and read column selecting signals WSEL_C and RSEL_C and row selecting signals WSEL_L and RSEL_L are depicted as outputs from the input signal control unit 90*b*. For example, when the count value STATE is '001', the write column selecting signal WSEL_C is '1000'; the write row selecting signal WSEL_L is the count value WCNT; the read column selecting signal RSEL_C is the count value RCNT; and the read row selecting signal RSEL_L is '1111'. With this, during write operations, the RAMs 100, 104, 108, and 112 are selected sequentially in the stated order each time the count value WCNT is incremented. During read operations, four RAMs 100 to 103, 104 to 107, 108 to 111, and 112 to 115 are selected sequentially in the stated order each time the count value RCNT is incremented.

Note that as for the column selecting signal WSEL_C and the row selecting signal WSEL_L, a logical AND with the write enable signal WEN is performed and the result is output. As for the column selecting signal RSEL_C and the row selecting signal RSEL_L, a logical AND with the read enable signal REN is performed and the result is output.

On the other hand, the output signal control unit 90*c* of FIG. 8 inputs the most significant bit of the count value STATE from the STATE count register 91*a*, the outputs DO0 to DO15 from the RAMs 100 to 115, and the count value RCNT from the RCNT count register 92*f*. Then, based on these signals, the output signal control unit 90*c* outputs four sets of parallel data LINE0, LINE1, LINE2, and LINE3. FIG. 10 illustrates an example of a relationship between input and output signals of an output signal control unit. In FIG. 10, the most significant bit STATE[2] of the count value STATE from the STATE count register 91*a* and the count value RCNT are depicted as inputs to the output signal control unit 90*c*. In addition, the four sets of parallel data LINE0, LINE1, LINE2, and LINE3 are depicted as outputs from the output signal control unit 90*c*.

When the most significant bit STATE[2] of the count value STATE is '0', the read column selecting signal RSEL_C is the count value RCNT and the read row selecting signal RSEL_L is '1111', as illustrated in FIG. 9. For example, since the RAMs 100, 104, 108, and 112 are selected when the count value RCNT is '1000', the parallel data LINE0 to LINE3 have the outputs DO0, DO4, DO8, and DO12, respectively, as illustrated in FIG. 10.

On the other hand, the most significant bit STATE[2] of the count value STATE is '1', the read column selecting signal RSEL_C is '1111' and the read row selecting signal RSEL_L is the count value RCNT, as illustrated in FIG. 9. For example, since the RAMs 100, 101, 102, and 103 are selected when the count value RCNT is '1000', the parallel data LINE0 to LINE3 have the outputs DO0, DO1, DO2, and DO3, respectively, as illustrated in FIG. 10.

Next described is an example of the storage area 90*a*.

Storage Area 90*a*

Figure 11:
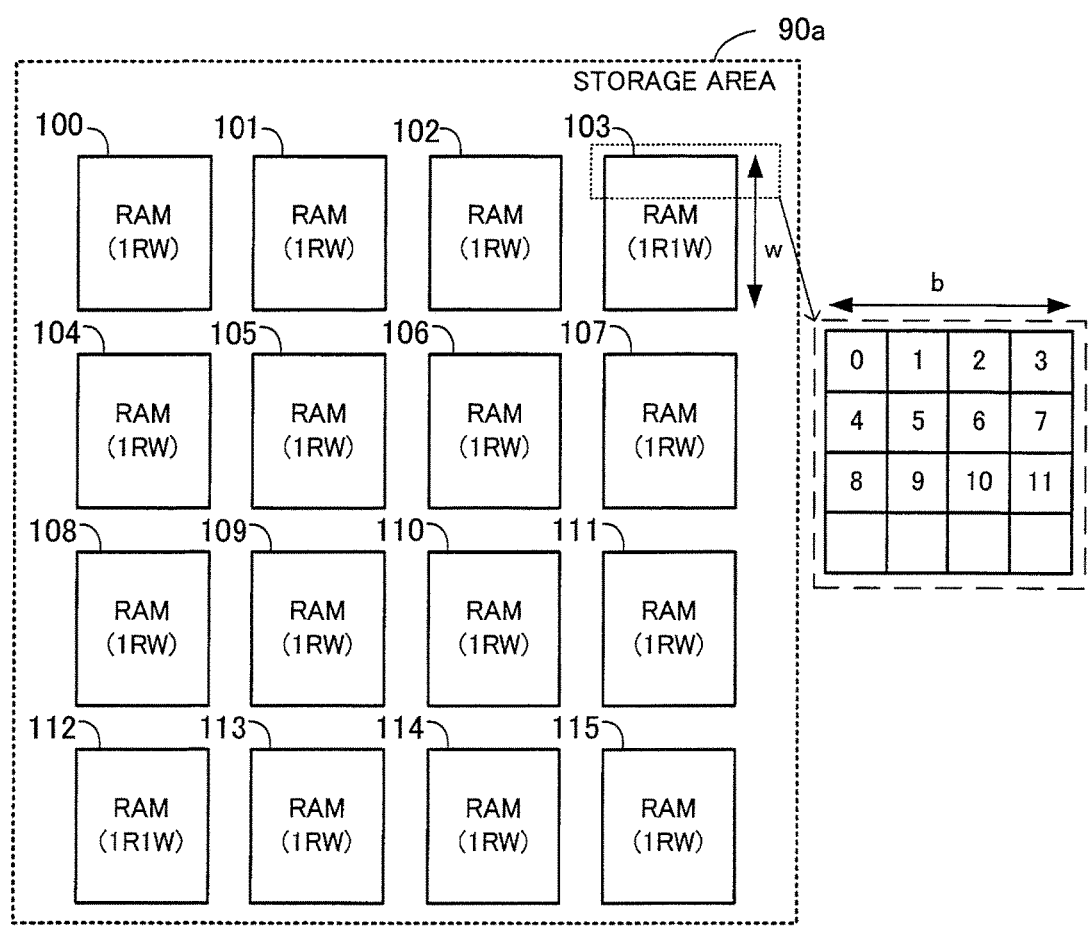
FIG. 11 illustrates an example of a storage area in the case of the parallel number N=4.

FIG. 11 illustrates an example of a storage area in the case of the parallel number N=4. In the case of the parallel number N=4, pixel data of one horizontal line of the image pickup devices 62 is stored in four row- or column-wise RAMs selected from among the RAMs 100 to 115. In each of the RAMs 100 to 115, the number of bits b corresponds to four pixels, and the number of words w (four pixels per word) is 1/16 of the maximum horizontal pixel size.

Note in FIG. 8 that the RAMs 103 and 112 are implemented by dual-port RAMs, such as 1R1W, because a read access to each of the RAMs 103 and 112 occurs during a write access thereto, however, the remaining RAMs are implemented by single-port RAMs, such as 1RW. Thus, this embodiment uses two types of RAMs, however, in order to allow them to be dealt with in the same manner, the following interfaces are used, for example.

Figure 12:
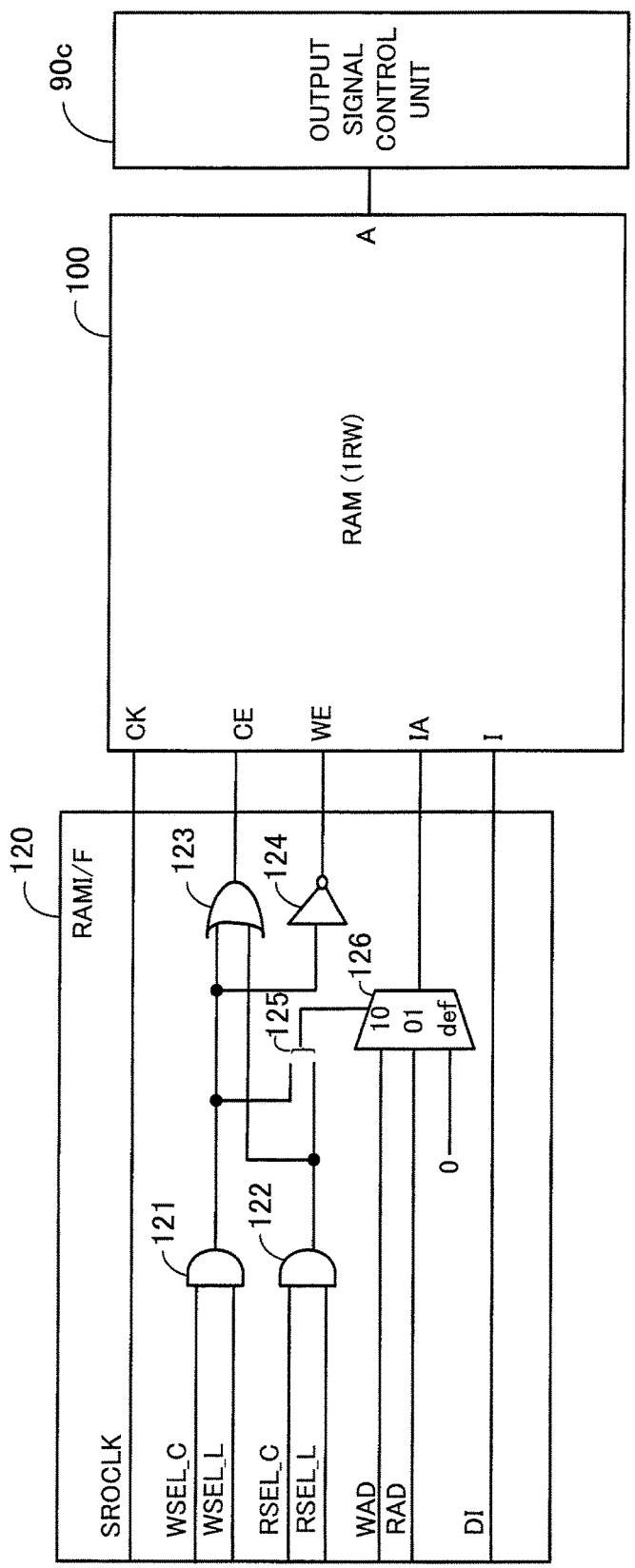
FIG. 12 illustrates an example of a RAM interface used for a single-port RAM (1RW)

FIG. 12 illustrates an example of a RAM interface used for a single-port RAM (1RW). A RAM interface 120 includes AND circuits 121 and 122, an OR circuit 123, an inverter circuit 124, a bit connection circuit 125, and a selection circuit 126. The write column selecting signal WSEL_C and row selecting signal WSEL_L are individually input to two input terminals of the AND circuit 121. The read column selecting signal RSEL_C and row selecting signal RSEL_L are individually input to two input terminals of the AND circuit 122. Output signals of the AND circuits 121 and 122 are individually input to two input terminals of the OR circuit 123, whose output signal is then input to a chip enable terminal CE of the RAM 100. An output signal of the AND circuit 121 is input to the inverter circuit 124, whose output signal is then input to a write enable terminal WE of the RAM 100.

The bit connection circuit 125 connects the output signals of the AND circuits 121 and 122 to thereby supply a 2-bit selection signal to the selection circuit 126. The selection circuit 126 inputs the write address WAD, the read address RAD, and a value '0', and outputs the write address WAD when the input selection signal is '10' and outputs the read address RAD when the selection signal is '01'. If the selection signal is a value def other than '10' and '01', the selection circuit 126 outputs '0'. The output signal of the selection circuit 126 is input to an address terminal IA of the RAM 100. A clock SROCLK from a clock supply unit (not illustrated) is input to a clock terminal CK of the RAM 100, and input data DI is input to a write data input terminal I of the RAM 100. In addition, read data read from a read data output terminal A of the RAM 100 is supplied to the output signal control unit 90*c*. The same type of interfaces are used for other single-port RAMs (1RW) in the storage area 90*a*.

Figure 13:
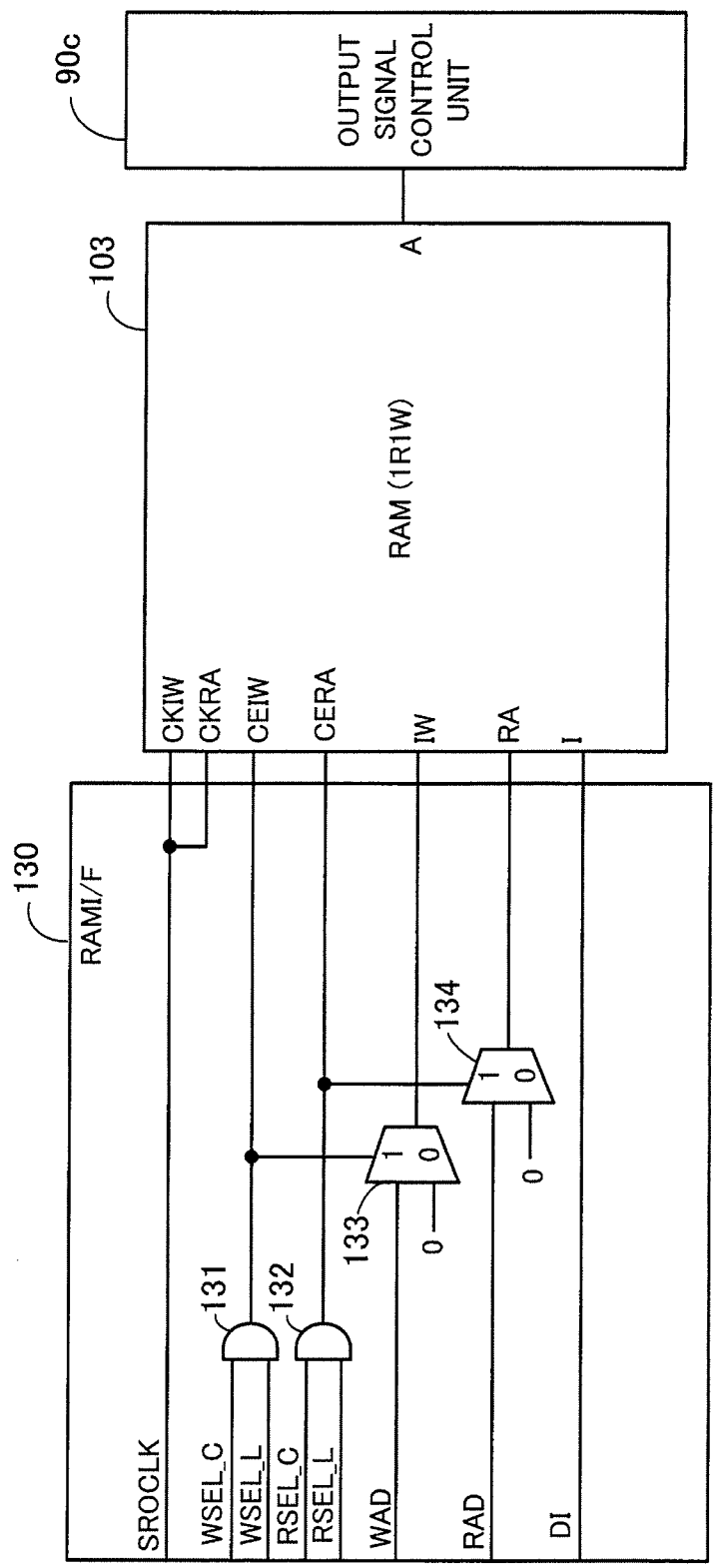
FIG. 13 illustrates an example of a RAM interface used for a double-port RAM (1R1W)

FIG. 13 illustrates an example of a RAM interface used for a double-port RAM (1R1W). A RAM interface 130 includes AND circuits 131 and 132 and selection circuits 133 and 134. The write column selecting signal WSEL_C and row selecting signal WSEL_L are individually input to two input terminals of the AND circuit 131. The read column selecting signal RSEL_C and row selecting signal RSEL_L are individually input to two input terminals of the AND circuit 132. An output signal of the AND circuit 131 is input to a write enable terminal CEIW of the RAM 103 and also supplied to the selection circuit 133 as a selection signal. An output signal of the AND circuit 132 is input to a read enable terminal CERA of the RAM 103 and also supplied to the selection circuit 134 as a selection signal.

The selection circuit 133 inputs the write address WAD and a value '0', and outputs the write address WAD when the input selection signal is '1' and outputs '0' when the selection signal is '0'. The output signal of the selection circuit 133 is input to a write address terminal IW of the RAM 103. The selection circuit 134 inputs the read address RAD and a value '0', and outputs the read address RAD when the input selection signal is '1' and outputs '0' when the selection signal is '0'. The output signal of the selection circuit 134 is input to a read address terminal RA of the RAM 103.

The clock SROCLK from the clock supply unit (not illustrated) is input to a write clock terminal CKIW and a read clock terminal OKRA of the RAM 103, and the input data DI is input to a write data input terminal I of the RAM 103. In addition, read data read from a read data output terminal A of the RAM 103 is supplied to the output signal control unit 90*c*.

The same type of interface is used for the RAM 112 which is the other double-port RAM (1R1W) in the storage area 90*a*. The use of the RAM interfaces 120 and 130 of FIGS. 12 and 13 allows the different types of RAMs to be dealt with in the same manner.

Next described are operations of the line segment processing unit 72*c* of this embodiment.

Operations of Line Segment Processing Unit 72*c*

Figure 14:
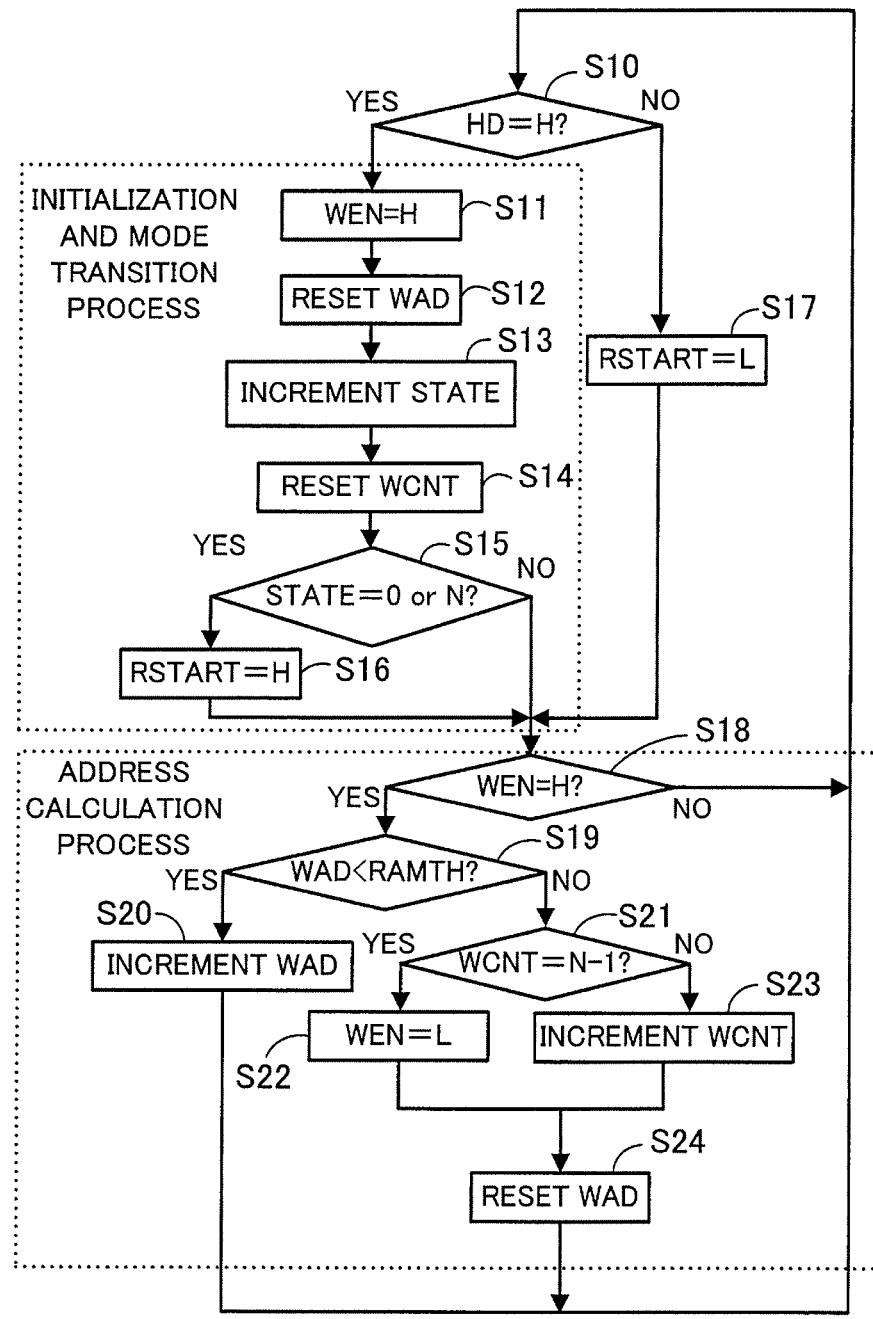
FIG. 14 is a flowchart illustrating an example of a parallel data writing process.

FIG. 14 is a flowchart illustrating an example of a parallel data writing process. The WEN generating unit 91*b* of the write control unit 91 determines whether the horizontal synchronizing signal HD is at H level (step S10). If the horizontal synchronizing signal HD is at H level, the WEN generating unit 91*b* sets the write enable signal WEN to H level (i.e., asserts the write enable signal WEN) (step S11). This starts the following initialization and mode transition process.

When the write enable signal WEN is set to H level, the WAD count register 91*c* resets the write address WAD to '0' (step S12). Subsequently, the STATE count register 91*a* increments the count value STATE (step S13), and the WONT count register 91*e* resets the count value WONT to '0' (step S14). Note that each time the count value STATE is incremented, the writing and reading state makes a transition, for example, as illustrated in FIG. 1. In the case of N=4, there are eight writing and reading states as in FIG. 1. When the count value STATE is '1', the writing and reading state is one at the upper left (writes of 1st line). Subsequently, the RSTART generating unit 91*f* determines whether the count value STATE is either '0' or the parallel number N (step S15), and sets a read start signal RSTART to H level (step S16) if the count value STATE is either one of them. For example, in the case of the parallel number N=4, reads start during writes of the fourth and eighth lines, as illustrated in FIG. 1, when the count value STATE is '4' and '0', respectively.

When the count value STATE is neither '0' nor N, the process advances to step S18. Note that if the horizontal synchronizing signal HD is at L level in step S10, the RSTART generating unit 91*f* sets the read start signal RSTART to L level (step S17), and then the process advances to step S18.

In step S18, the WAD count register 91*c* determines whether the write enable signal WEN is at H level. If the write enable signal WEN is at L level, the processing starting from step S10 is repeated. If the write enable signal WEN is at H level, the following address calculation process is carried out. When the write enable signal WEN is at H level, a write is performed, and then the comparing unit 91*d* determines whether the write address WAD has reached the threshold RAMTH (step S19). If the write address WAD has yet to reach the threshold RAMTH (WAD<RAMTH), the WAD count register 91*c* increments the write address WAD (step S20) to then allow a subsequent write to take place. Subsequently, the processing starting from step S10 is repeated.

When the write address WAD has reached the threshold RAMTH, writes for one of the N×N RAMs are completed. At this point in time, the WONT count register 91*e* determines whether the count value WONT is N-1 (step S21). This step is to see if pixel data of one horizontal line in the image pickup devices 62 has been written to N column- or row-wise RAMs. Then, when the count value WONT is N-1, the WONT count register 91*e* causes the WEN generating unit 91*b* to set the write enable signal WEN to L level (step S22). With this, the write operation is stopped. When the count value WONT is not N-1, the WONT count register 91*e* increments the count value WONT (step S23). With this, the next RAM is selected. After steps S22 and S23, the WAD count resister 91*c* resets the write address WAD to '0' (step S24). Subsequently, the processing starting from step S10 is repeated. Note that the writing process above is ended, for example, if the power of the image data processing apparatus 70 is turned off during the process.

Figure 15:
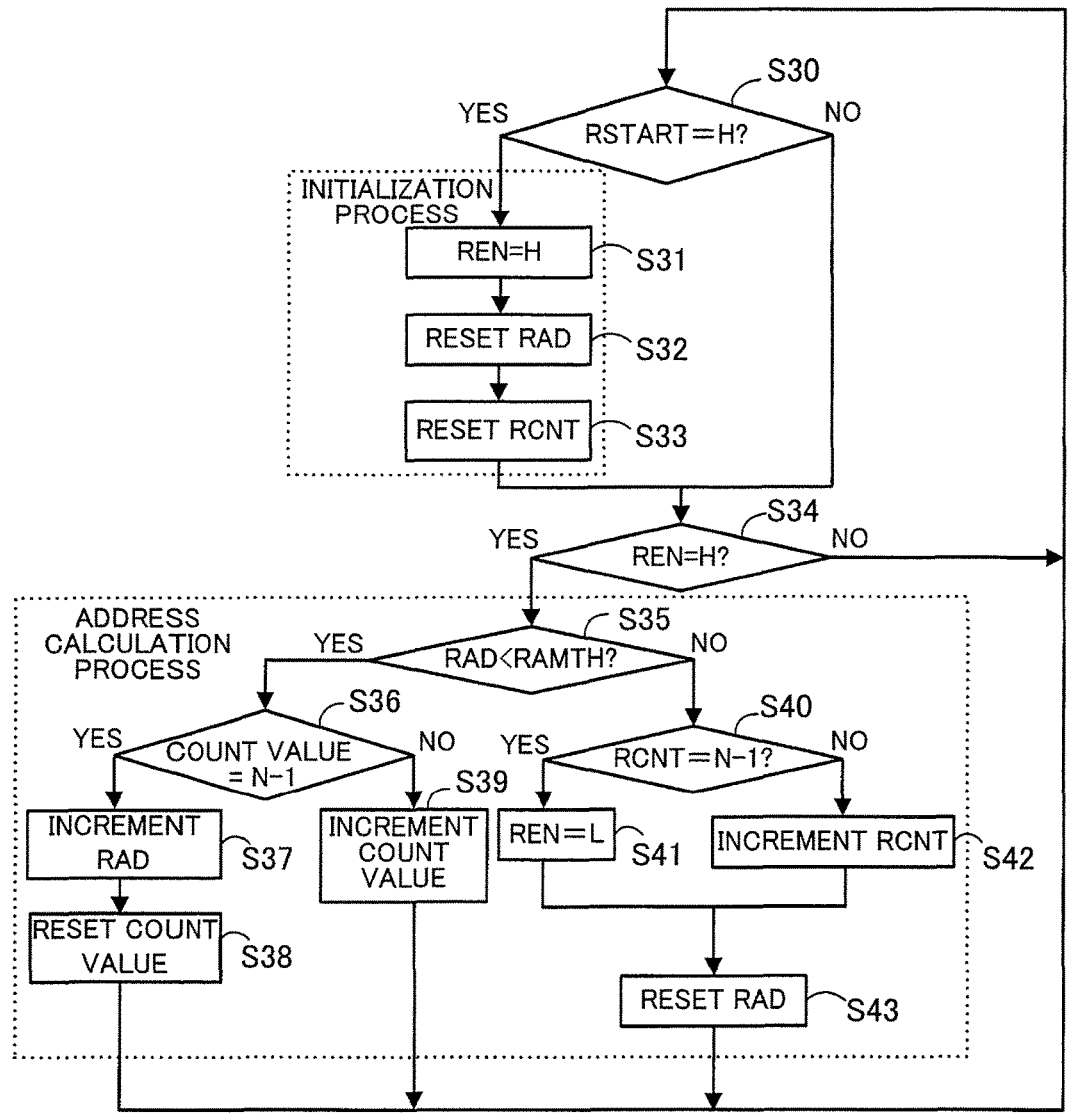
FIG. 15 is a flowchart illustrating an example of a parallel data reading process.

FIG. 15 is a flowchart illustrating an example of a parallel data reading process. The REN generating unit 92*a* of the read control unit 92 determines whether the read start signal RSTART is at H level (step S30). If the read start signal RSTART is at H level, the REN generating unit 92*a* sets the read enable signal REN to H level (step S31). This starts the following initialization process. In the initialization process, the RAD count register 92*d* resets the read address RAD to '0' (step S32), and the RCNT count register 92*f* resets the count value RCNT to '0' (step S33). After step S33 or if the read start signal RSTART is at L level in step S30, the process advances to step S34.

In step S34, the RAD count register 92*d* determines whether the read enable signal REN is at H level. When the read enable signal REN is at L level, the processing starting from step S30 is repeated. When the read enable signal REN is at H level, the following address calculation process is carried out.

When the read enable signal REN is at H level, the comparing unit 92e determines whether the read address RAD has reached the threshold RAMTH (step S35). When the read address RAD has yet to reach the threshold RAMTH (RAD<RAMTH), the timing adjustment counter 92b determines whether the count value is N−1 (step S36). If the count value is N−1, the RAD count register 92d increments the read address RAD (step S37) and the timing adjustment counter 92b resets the count value (step S38) in order to start reads. When the count value has yet to reach N−1, the timing adjustment counter 92b increments the count value for adjusting the timing to start reads (step S39). After steps S38 and S39, the operation starting from step S30 is repeated.

When the read address RAD has reached the threshold RAMTH, reads for N column- or row-wise RAMs are completed. At this point in time, the RCNT count register 92f determines whether the count value RCNT is N−1 (step S40). If the count value RCNT is N−1, reads of N lines in the N×N RAMs are ended. Then, the RCNT count register 92f causes the REN generating unit 92a to set the read enable signal REN to L level (step S41). When the count value RCNT has yet to reach N−1, the RCNT count register 92f increments the count value RCNT (step S42). After steps S41 and S42, the RAD count register 92d resets the read address RAD (step S43). Subsequently, the processing starting from step S30 is repeated. With this, reads for the next N column- or row-wise RAMs are performed. Note that the reading process above is ended, for example, if the power of the image data processing apparatus 70 is turned off during the process.

Figure 16:
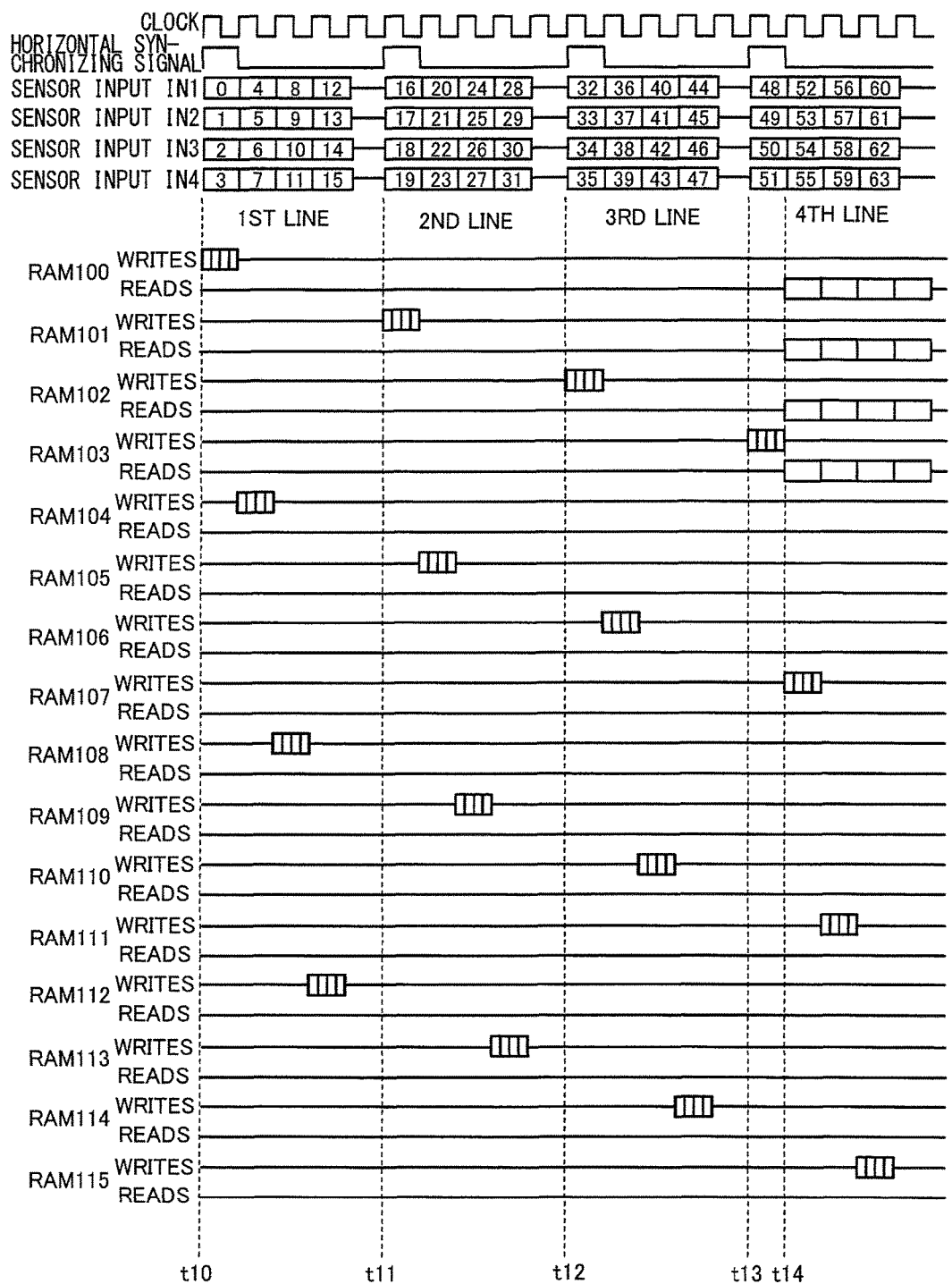
FIG. 16 is a first timing diagram illustrating an example of a data reordering process implemented by the line segment processing unit in the case of the parallel number N=4.
Figure 17:
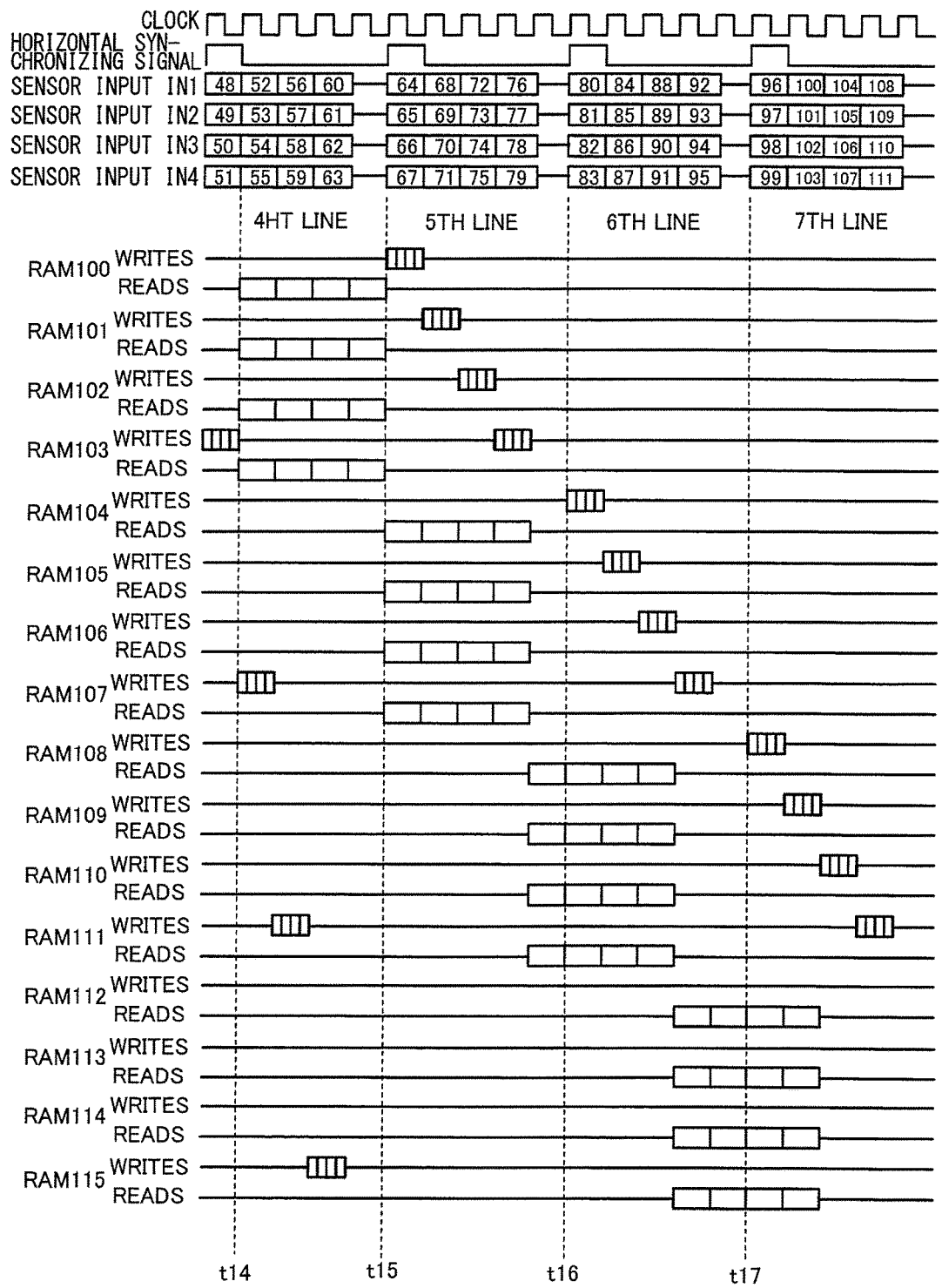
FIG. 17 is a second timing diagram illustrating the example of the data reordering process implemented by the line segment processing unit in the case of the parallel number N=4.
Figure 18:
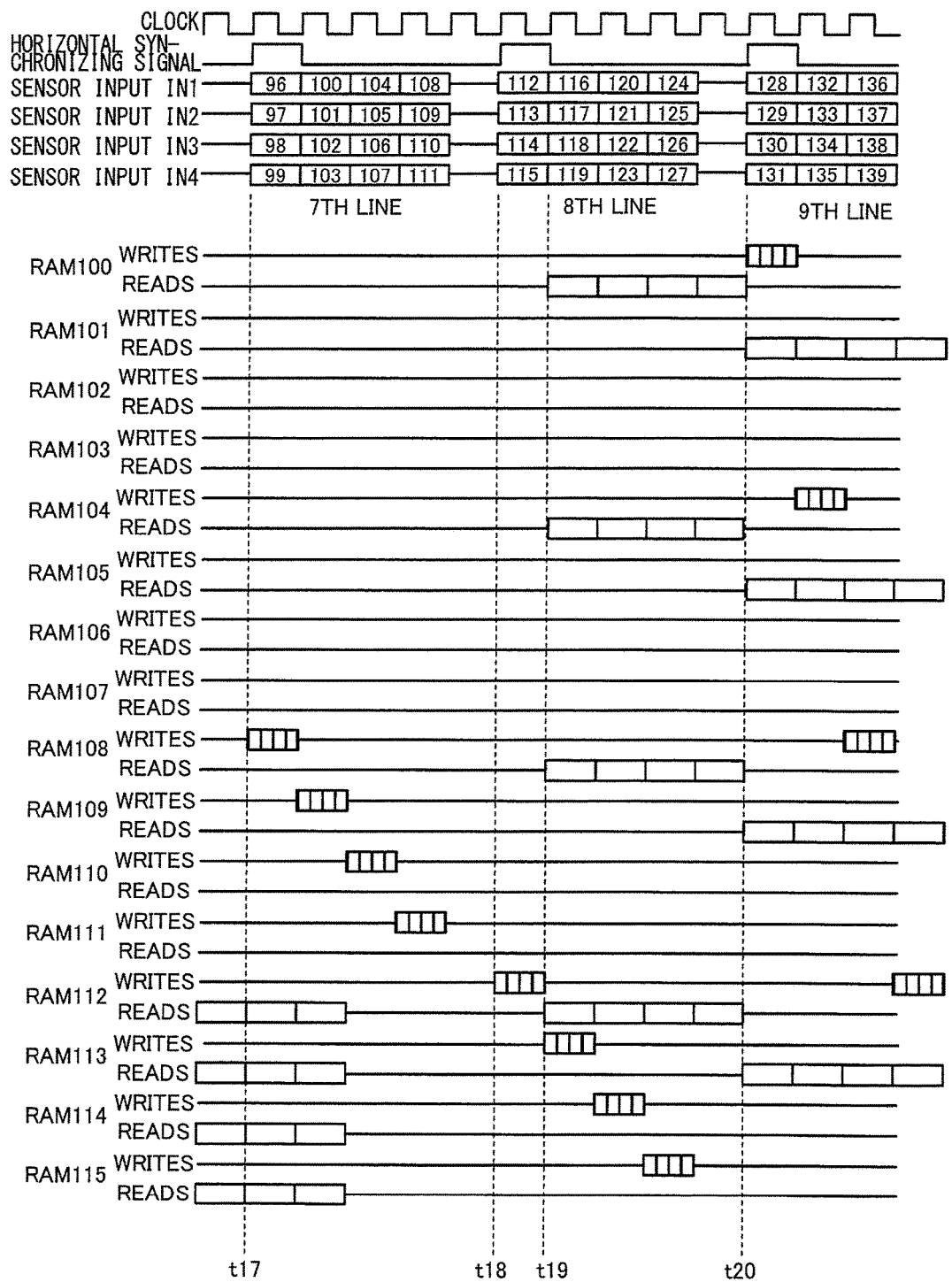
FIG. 18 is a third timing diagram illustrating the example of the data reordering process implemented by the line segment processing unit in the case of the parallel number N=4.

Next described is an example of a data reordering process implemented by the line segment processing unit 72c in the case of the parallel number N=4. FIGS. 16, 17, and 18 are timing diagrams illustrating an example of a data reordering process implemented by a line segment processing unit in the case of the parallel number N=4. Each of the timing diagrams illustrates, from the top, the clock signal of the image data processing apparatus 70, the horizontal synchronizing signal, four sets of parallel pixel data input to the line segment processing unit 72c (sensor inputs IN1 to IN4), and writes and reads of the individual RAMs 100 to 115.

When a pulse of the horizontal synchronizing signal corresponding to one cycle of the clock signal is generated (at time t10), pixel data of the first line in the image pickup devices 62 is converted into parallel data by the parallelizing unit 72b. Then, pixel data in sets of four pixels, that is, the sensor inputs IN1 to IN4 illustrated in FIG. 16 are written sequentially to the individual column-wise RAMs 100, 104, 108, and 112, first.

When the next pulse of the horizontal synchronizing signal is generated (at time t11) after writes of 16 pixels of the first line are completed, pixel data of the second line is converted into parallel data by the parallelizing unit 72b. Then, pixel data in sets of four pixels, that is, the sensor inputs IN1 to IN4 are written sequentially to the individual RAMs 101, 105, 109, and 113 in the second column. Similarly at time t12 when a pulse of the horizontal synchronizing signal is generated, pixel data in sets of four pixels of the third line is written sequentially to the individual RAMs 102, 106, 110, and 114 in the third column.

At time t13 when a pulse of the horizontal synchronizing signal is generated, pixel data in sets of four pixels of the fourth line is written sequentially to the individual RAMs 103, 107, 111, and 115 in the fourth column. Note here that reads are started when writes of the first word are completed (at time t14). As for the reads started at time t14, the four row-wise RAMs 100 to 103 are selected simultaneously, and the pixel data written up to time t14 is read therefrom in parallel.

At time t15, the RAM selection direction for write operations is changed from column-wise to row-wise. When a pulse of the horizontal synchronizing signal is generated at time t15, pixel data of the fifth line is written sequentially to the first-row RAMs 100 to 103 on which the reads have been completed. In addition, when the reads from the RAMs 100 to 103 in the first row are completed, reads are continuously performed in a sequential manner from the RAMs 104 to 107 in the second row, the RAMs 108 to 111 in the third row, and then the RAMs 112 to 115 in the fourth row.

At time t16 when a pulse of the horizontal synchronizing signal is generated, pixel data of the sixth line is written sequentially to the second-row RAMs 104 to 107 on which the reads have been completed. Similarly at time t17 when a pulse of the horizontal synchronizing signal is generated, pixel data of the seventh line is written sequentially to the third-row RAMs 108 to 111 on which the reads have been completed.

At time t18 when a pulse of the horizontal synchronizing signal is generated, pixel data of the eighth line is written sequentially to the fourth-row RAMs 112 to 115 on which the reads have been completed. In addition, reads are started when writes of the first word are completed (at time t19). As for the reads started at time t19, the RAM selection direction is changed from row-wise to column-wise. First, the four column-wise RAMs 100, 104, 108, and 112 are selected simultaneously, and the pixel data written up to time t19 is read therefrom in parallel.

As for writes, on the other hand, at time t20 when a pulse of the horizontal synchronizing signal is generated after the writes to the fourth-row RAMs 112 to 115 are completed, pixel data of the ninth line is written sequentially to the first-column RAMs 100, 104, 108, and 112 on which the reads have been completed. That is, the RAM selection direction for write operations is changed from row-wise to column-wise.

Note that when the reads from the RAMs 100, 104, 108, and 112 are completed, reads from the RAMs 101, 105, 109, and 113 in the second column are performed in a continuous manner. Also after this point in time, subsequent writes and reads are performed in a similar fashion.

According to the above-described processes, the parallel data sets (the sensor inputs IN1 to IN4) each having a data sequence where pixel data appears not in raster scan order but in a skipping manner with an interval are reordered, and are then output as the four sets of parallel data LINE0, LINE1, LINE2, and LINE3 each having the raster scan sequence.

According to the image data processing apparatus 70 and the image data processing method described above, it is possible to process data read from the image pickup devices 62 as N (≥2) sets of parallel data, to thereby reduce the process frequency to 1/N of the operating frequency of the image pickup devices 62. In addition, even in the case of the parallel number N=4, writes are carried out on four RAMs after reads from the RAMs are completed, as illustrated in FIGS. 16 to 18. Thus, there is no data overwriting while the read of the data is not completed.

According to FIGS. 16 and 18, the time period (blank) between two consecutive lines in the reads from the image pickup devices 62 is set to the minimum, one cycle (i.e., one cycle of the clock signal), however, actual reads from the image pickup devices 62 include each blank corresponding to several tens of cycles or more. Once being started, reads are performed at once over cycles corresponding to the horizontal pixel size, as illustrated in FIGS. 16 to 18, irrespective of the timing of writes of each line. Reads may be completed earlier than a point in time illustrated in FIGS. 16 to 18 depending on the number of cycles for the blank. In any case, writes do not overtake reads even with the minimum blank, as illustrated in FIGS. 16 to 18, and therefore data corruption due to data overwriting does not occur.

In the case of N=4, for example, the 4×4 RAMs 100 to 115 together have the capacity to store pixel data of four lines, as illustrated in FIGS. 8 and 11. Therefore, this reduces the RAM capacity compared to the case of using RAMs for storing pixel data of six lines in order to prevent data corruption. As illustrated in FIGS. 16 to 18, writes and reads are separately performed on the individual RAMs except for the RAMs 103 and 112. The RAMs 103 and 112 may be implemented by dual-port RAMs, such as 1R1W, because a read access to each of the RAMs 103 and 112 occurs during a write access thereto. On the other hand, the remaining RAMs may be implemented by single-port RAMs, such as 1RW. Compared to a dual-port RAM, a single-port RAM has a significantly reduced area, thus preventing an increase in the circuit area.

Note that, in FIGS. 16 to 18, the reads of the fourth and eighth lines are started upon the end of one cycle after the start of the writes of the corresponding lines, however, they may be started a few cycles later. In such a case, for example, the reads may not be completed at time t15 of FIG. 17, and a write access and a read access may simultaneously occur at the same RAM other than the RAMs 103 and 112. However, if the above-described blank is larger than the number of cycles corresponding to the time lag between the start of the write access and that of the read access, such simultaneous write and read accesses to the same RAM do not occur. Note that the time lag between the start of the write access and that of the read access is only a few cycles to wait for pixel data of one word to be written (only one cycle in the case of FIGS. 16 to 18). On the other hand, the blank is originally set to several tens of cycles for a process in another circuit. Therefore, it is possible to prevent the occurrence of simultaneous write and read accesses to the same RAM except for the RAMs 103 and 112. Thus, the image data processing apparatus 70 and the image data processing method of this embodiment enable appropriate parallelization of pixel data using a small-scale circuit.

Although the capacity of each RAM to be used varies according to processes involved, in the case of, for example, the 65-nm technology being used, the maximum horizontal pixel size being 6784 pixels, and each pixel being 14 bits, the capacity of a 1R1W RAM for storing pixel data of one line is 7 megabytes. Therefore, when two 1R1W RAMs for storing pixel data of two lines are used to achieve double parallel processing, for example, the capacity needed is: 7×2=14 megabytes. In the case of quadruple parallel processing, when six 1R1W RAMs are used to store pixel data of six lines in order to prevent data corruption, the capacity needed is as much as 7×6=42 megabytes.

On the other hand, in the case where quadruple parallel processing is performed in the image data processing apparatus 70 of this embodiment, each of the RAMs 100 to 115 stores therein pixel data of ¼ line, and therefore each 1R1W RAM has a capacity of 1.7 megabytes and each 1RW RAM has a capacity of 0.9 megabytes. Since, among the sixteen RAMs 100 to 115, the RAMs except for the RAMs 103 and 112 are implemented by 1RW RAMs as described above, the total RAM capacity is: 1.7×2+0.9×14=16 megabytes. Thus, compared to the case of using six 1R1W RAMs, the needed RAM capacity is significantly reduced, which results in a reduction in the circuit area. Further, even compared to the case of using two 1R1W RAMs for storing pixel data of two lines in order to perform double parallel processing, the image data processing apparatus 70 of this embodiment achieves quadruple parallel processing with only a 14 percent increase in RAM capacity.

Having described one aspect of the image data processing apparatus and the image data processing method based on the embodiment above, this is merely an example and embodiments are not limited to the particular details of this illustrative example. For example, the case of N=4 is mainly described above as an example of the N parallel processing, however, the embodiment is also applicable when N=2 or 3, or N≥5. The following describes an example of control on writes and reads of pixel data exercised in the line segment processing unit 72c in the case of N=3, that is, in the case where the image data processing apparatus 70 receives data in sets of three pixels and processes the three sets of data in parallel.

Figure 19:
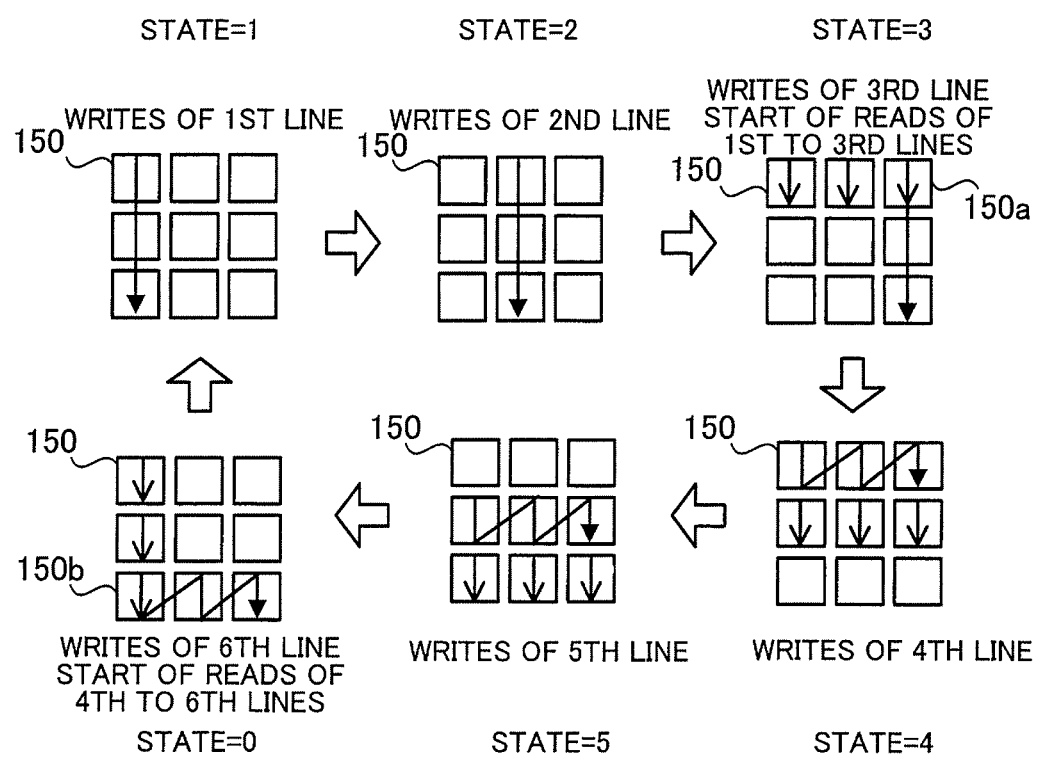
FIG. 19 illustrates an example of write and read control on 3×3 RAMs.

FIG. 19 illustrates an example of write and read control on 3×3 RAMs. FIG. 19 depicts six states in each of which writes, or writes and reads, take place in the 3×3 RAMs. Each of the states is represented by the above-described count value STATE. Pixel data of one line of the image pickup devices 62 is stored in three column- or row-wise RAMs 150 selected from among the 3×3 RAMs 150. The write control unit 91 sequentially selects column-wise RAMs 150 from the 3×3 RAMs 150, and causes each of the selected RAMs 150 to write thereto pixel data in sets of three pixels input in parallel from the parallelizing unit 72b. In this manner, as for horizontal read lines of the image pickup devices 62, pixel data of the read lines is first written to the selected column-wise RAMs 150, sequentially from the first line.

After completing writes of pixel data of three lines, the write control unit 91 then switches the RAM selection direction for write operations from column-wise to row-wise. Subsequently, after completing writes of pixel data of another three lines, the write control unit 91 switches the RAM selection direction from row-wise to column-wise. During writes of pixel data of the third line (STATE=3) after the RAMs 150 are selected in the column direction, the read control unit 92 selects three row-wise RAMs 150 to thereby start reads of pixel data of the first to third lines. At the completion of the writes of the pixel data of the third line, reads from the RAMs 150 in the first row are completed. This therefore allows pixel data of the fourth line to be written to the RAMs 150 in the first row right away.

In addition, during writes of pixel data of the sixth line (STATE=0) after the RAM selection direction is switched to row-wise, the read control unit 92 selects three column-wise RAMs 150 to thereby start reads of pixel data. At the completion of the writes of the pixel data of the sixth line, reads from the three RAMs 150 in the first column are completed. This therefore allows pixel data of the seventh line to be written to the RAMs 150 in the first column right away. The same control is exercised on pixel data of the seventh and subsequent lines of the image pickup devices 62.

According to the above-described control, writes and reads are made at different times to each of the 3×3 RAMs 150, except for RAMs 150a and 150b on which write and read accesses are performed simultaneously at the count value STATE=3 and 0, respectively. For this reason, single-port RAMs such as 1RW are used to implement the RAMs 150 except for the RAMs 150a and 150b, resulting in a reduction in the circuit area. In addition, it is possible to hinder data of a new line from being written at addresses where reads of a previous line have yet to be completed, thus preventing pixel data of the previous line from being overwritten and corrupted.

According to the disclosed image data processing apparatus and method, parallelization of pixel data is achieved using a small-scale circuit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image data processing apparatus comprising:
N×N memories configured to store pixel data of N (N≥2) read lines of image pickup devices;
write control circuit configured to select, in a row or column direction, memories for writing from among the N×N memories, write the pixel data in sets of N pixels to each of the memories selected for writing, and switch a selection direction for selecting the memories for writing each time writes of the pixel data of the N read lines are completed; and
read control circuit configured to select, in a direction different from the selection direction, N memories for reading from among the N×N memories and start parallel reads of the written pixel data of the N read lines during writes of the pixel data of every N-th read line,
wherein:
among the N×N memories, each of the memories to be first selected in the writes of the pixel data of every N-th read line performs a write and a read using different terminals thereof and each of remaining memories performs a write and a read using a common terminal thereof;
the write control circuit writes N sets of first parallel data in sets of N pixels to each of the N memories selected for writing, the N sets of first parallel data each having a data sequence where one out of every N pixels in a reading order of the pixel data being read from the image pickup devices appears; and
each of N sets of second parallel data read from the N memories selected for reading has a data sequence sorted in the reading order.

2. The image data processing apparatus according to claim 1, wherein prior to start of writes of the pixel data of one read line to the N memories selected for writing, reads of the pixel data previously written to the N memories selected for writing have been completed.

3. The image data processing apparatus according to claim 1, wherein the read control circuit starts the parallel reads when writes of the pixel data of one word are completed during the writes of the pixel data of every N-th read line.

4. The image data processing apparatus according to claim 1, further comprising:
parallelizing circuit configured to receive the pixel data according to the reading order and then generate the N sets of first parallel data.

5. The image data processing apparatus according to claim 1, further comprising two types of interfaces configured to operate the memories to be first selected and the remaining memories by using a same control signal or address.

6. An image data processing method comprising:
selecting, by a write control circuit, in a row or column direction, N memories for writing from among N×N memories configured to store pixel data of N (N≥2) read lines of image pickup devices and writing the pixel data in sets of N pixels to each of the memories selected for writing, and switching a selection direction for selecting the memories for writing each time writes of the pixel data of the N read lines are completed;
selecting, by a read control circuit, in a direction different from the selection direction, N memories for reading from among the N×N memories and starting parallel reads of the written pixel data of the N read lines during writes of the pixel data of every N-th read line; and
performing, by each of memories to be first selected in the writes of the pixel data of every N-th read line, a write and a read using different terminals thereof, and performing, by each of remaining memories of the N×N memories, a write and a read using a common terminal thereof,
wherein:
the write control circuit writes N sets of first parallel data in sets of N pixels to each of the N memories selected for writing, the N sets of first parallel data each having a data sequence where one out of every N pixels in a reading order of the pixel data being read from the image pickup devices appears, and
each of N sets of second parallel data read from the memories selected for reading has a data sequence sorted in the reading order.

* * * * *